United States Patent
Zhang et al.

(10) Patent No.: US 11,845,573 B2
(45) Date of Patent: Dec. 19, 2023

(54) CONFIGURATION CONSTRUCTION AND ATTITUDE CONTROL METHOD FOR PYRAMID DEORBIT SAIL

(71) Applicant: BEIJING INSTITUTE OF TECHNOLOGY, Beijing (CN)

(72) Inventors: Jingrui Zhang, Beijing (CN); Ruonan Zhang, Beijing (CN); Keying Yang, Beijing (CN); Lincheng Li, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/961,125

(22) Filed: Oct. 6, 2022

(65) Prior Publication Data
US 2023/0113577 A1    Apr. 13, 2023

(30) Foreign Application Priority Data

Oct. 8, 2021   (CN) .......................... 202111169293.2

(51) Int. Cl.
*B64G 1/40*     (2006.01)
*B64G 1/24*     (2006.01)

(52) U.S. Cl.
CPC .............. *B64G 1/407* (2013.01); *B64G 1/245* (2023.08)

(58) Field of Classification Search
CPC ......... B64G 1/407; B64G 1/245; Y02T 90/00; G05D 1/0833
See application file for complete search history.

(56) References Cited

PUBLICATIONS

Long, Alexander, "Development of a Passively Stable Pyramid Sail to Deorbit Small Satellites", Aug. 2018, Georgia Institute of Technology, All pages.*
Miguel et al., "Deorbiting Spacecraft with Passively Stabilised Attitude Using a Simplified Quasi-Rhombic-Pyramid Sail", Apr. 11, 2020, Science Direct, All pages.*

* cited by examiner

*Primary Examiner* — Valentina Xavier
(74) *Attorney, Agent, or Firm* — MILLEN, WHITE, ZELANO & BRANIGAN, P.C.; William Nixon; Wan-Ching Montfort

(57) ABSTRACT

Provided is a configuration construction and attitude control method for a pyramid deorbit sail. By taking into consideration environmental perturbation like atmospheric resistance perturbation and non-spherical earth perturbation, a dynamics model featuring three-dimensional orbit-and-attitude coupling based on position vectors and quaternion descriptions, the deorbit sail is taken as a rigid body, a spacecraft body is taken as a mass point, airflow obstruction is considered in the windward area, thereby improving the precision of the dynamics model; based on this model, the law of influence of the configuration parameters in the deorbit sail, such as a cone angle and a strut length, on the attitude stability and deorbiting efficiency of the spacecraft in different cases is analyzed, the configuration parameters of the pyramid deorbit sail system are analyzed and optimized according to the derived law, so as to obtain a pyramid deorbit sail achieving high attitude stability and high deorbiting efficiency.

9 Claims, 7 Drawing Sheets

US 11,845,573 B2

CONFIGURATION CONSTRUCTION AND ATTITUDE CONTROL METHOD FOR PYRAMID DEORBIT SAIL

CROSS REFERENCE TO RELATED APPLICATION

This patent application claims the benefit and priority of Chinese Patent Application No. 202111169293.2, filed with the China National Intellectual Property Administration on Oct. 8, 2021, the disclosure of which is incorporated by reference herein in its entirety as part of the present application.

TECHNICAL FIELD

The present disclosure belongs to the field of attitude dynamics and control for spacecrafts, and relates to a configuration construction and attitude control method for a pyramid deorbit sail, in particular to a stability analysis and attitude control method for a pyramid deorbit sail arranged on a spacecraft.

BACKGROUND

Actively deorbiting a spacecraft at the end of its life or after the completion of the mission is considered to be a necessary measure to remove space debris. In the low earth orbit, especially in the area below the 800 km, the atmospheric resistance has a significant impact on the spacecraft. In this case, a deorbit sail device can be used to increase the windward area of the spacecraft, so as to achieve rapid deorbiting. At present, most of deorbit sails for prototype development and in-orbit tests are planar deorbit sails, and few optimal configuration construction methods to maximize the deorbiting efficiency are proposed in the theoretical research of three-dimensional deorbit sails.

Compared with planar deorbit sails, a pyramid deorbit sail has many advantages. For example, no matter how the attitude changes, the projection area of the sail surface in the direction of vertical velocity is always greater than zero, thereby guaranteeing the deorbiting effectiveness. According to the present disclosure, by taking into consideration the influence of atmospheric resistance perturbation, non-spherical earth perturbation and airflow obstruction on the windward area of the sail surface, a deorbit sail system-oriented dynamics model is established for the pyramid deorbit sail, so as to describe a law of motion of the deorbit sail system in the deorbiting process. Based on this model, the law of influence of the configuration parameters in the deorbit sail, such as a cone angle and a strut length, on the attitude stability and deorbiting efficiency of the spacecraft is analyzed, and the configuration parameters of the pyramid deorbit sail system are analyzed and optimized according to the derived law, so as to obtain a pyramid deorbit sail achieving high attitude stability and high deorbiting efficiency. Based on the above model and the selected configuration parameters, a quaternion feedback-based repositioning Proportional-Integral-Derivative Control (PID) control law is designed, with an aim to achieve attitude stability of the spacecraft with the deorbit sail relative to the velocity direction and further improve the deorbiting efficiency.

SUMMARY

In order to solve the problem that the deorbiting efficiency of an existing pyramid deorbit sail used for deorbiting a spacecraft at the end of its life or after the completion of a mission cannot meet the operational requirements, an objective of the present disclosure is to provide a configuration construction method for a pyramid deorbit sail. According to the method, a pyramid deorbit sail system-oriented dynamics model featuring three-dimensional orbit-and-attitude coupling is established based on position vectors and quaternion descriptions. In the pyramid deorbit sail system-oriented dynamics model featuring three-dimensional orbit-and-attitude coupling, factors such as the influence of a windward area of a sail surface in the case of airflow obstruction on atmospheric resistance exerted on the pyramid deorbit sail and the further influence of the windward area of the sail surface in the case of airflow obstruction on an orbit and an attitude of the pyramid deorbit sail are considered, so as to improve precision of the pyramid deorbit sail system-oriented dynamics model featuring three-dimensional orbit-and-attitude coupling. In addition, based on this model, the law of influence of a cone angle and a strut length on the attitude stability and deorbiting efficiency in different cases is analyzed, and the configuration parameters of the pyramid deorbit sail system are analyzed and optimized according to the derived law, so as to obtain a pyramid deorbit sail achieving high attitude stability and high deorbiting efficiency, thereby improving the attitude stability and deorbiting efficiency of the spacecraft.

Based on the configuration construction method for a pyramid deorbit sail, the present disclosure further provides an attitude control method for a pyramid deorbit sail, which is implemented based on the configuration construction method for a pyramid deorbit sail to obtain the pyramid deorbit sail achieving high attitude stability and high deorbiting efficiency. According to the technical solution, based on the optimized configuration parameters of the pyramid deorbit sail, a quaternion feedback-based repositioning control law is designed, transfer of a velocity coordinate system with respect to the body coordinate system is considered in the quaternion feedback-based repositioning control law to develop a quaternion feedback-based repositioning Proportional-Integral-Derivative Control (PID) control law for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

The objective of the present disclosure is achieved by the following technical solution.

According to the configuration construction and attitude control method for a pyramid deorbit sail, by taking into consideration environmental perturbation like atmospheric resistance perturbation and non-spherical earth perturbation, a dynamics model featuring three-dimensional orbit-and-attitude coupling based on position vectors and quaternion descriptions, where the deorbit sail is taken as a rigid body, a spacecraft body is taken as a mass point, and airflow obstruction is considered in the windward area, thereby improving the precision of the pyramid deorbit sail system-oriented dynamics model featuring three-dimensional orbit-and-attitude coupling; based on this model, the law of influence of the configuration parameters in the deorbit sail, such as a cone angle and a strut length, on the attitude stability and deorbiting efficiency of the spacecraft in different cases is analyzed, and the configuration parameters of the pyramid deorbit sail system are analyzed and optimized according to the derived law, so as to obtain a pyramid deorbit sail achieving high attitude stability and high deorbiting efficiency, and thus improve the attitude stability and high deorbiting efficiency of the spacecraft. Based on the above model and the selected configuration parameters, a quaternion feedback-based repositioning Proportional-Integral-Derivative Control (PID) control law is designed, with an aim to achieve attitude stability of the spacecraft equipped with the deorbit sail relative to the velocity direction and improve the deorbiting efficiency.

The configuration construction method for a pyramid deorbit sail includes the following steps:

step 1, with environmental perturbations like atmospheric resistance perturbation and non-spherical earth perturbation taken into consideration, establishing a pyramid deorbit sail system-oriented dynamics model featuring three-dimensional orbit-and-attitude coupling based on position vectors and quaternion descriptions, and considering, in the pyramid deorbit sail system-oriented dynamics model featuring three-dimensional orbit-and-attitude coupling, factors such as the influence of a windward area of a sail surface in the case of airflow obstruction on atmospheric resistance exerted on the pyramid deorbit sail and the further influence of the windward area of the sail surface in the case of airflow obstruction on an orbit and an attitude of the pyramid deorbit sail so as to improve precision of the pyramid deorbit sail system-oriented dynamics model featuring three-dimensional orbit-and-attitude coupling.

During dynamics modeling of the pyramid deorbit sail system, the deorbit sail is taken as a rigid body, mass of struts is allocated to the thin-filmed sail surface as an equivalent form of surface density, and a spacecraft body is taken as a mass point. A pyramid deorbit sail device is installed at an O-point on the spacecraft body, and includes a plurality of struts and a plurality of thin-filmed sail surfaces. Struts are deployed and extended in an inclination direction, and every two adjacent struts are connected to the triangular thin-filmed sail surface. The struts of the pyramid deorbit sail are of equal length, an included angle between each of the struts and a symmetry axis of the deorbit sail is the same, and a distance between tops of any two adjacent struts is the same. A body coordinate system $Ox_b y_b z_b$ is established with the O point as an origin, where a $y_b$ axis coincides with the symmetry axis of the deorbit sail and points to the spacecraft body from the deorbit sail, which is in line with the right-hand rule.

Regarding a spacecraft in low earth orbit, given that environmental perturbations like atmospheric resistance perturbation and non-spherical earth perturbation are important influence factors on orbital motion of the spacecraft, a rate of change of orbital state vectors such as a geocentric distance r and a velocity v is defined in formula (1-1); and for the purpose of avoiding singularity, a spacecraft attitude is described using a quaternion algorithm, as expressed in formula (1-2) and formula (1-3). Torque T imparted on the spacecraft is a vector sum of control torque and environmental torque, in which the environmental torque takes into account aerodynamic torque and gravity gradient torque. Formula (1) gives a pyramid deorbit sail system-oriented dynamics model featuring three-dimensional orbit-and-attitude coupling established based on position vectors and quaternion descriptions, and the spacecraft is equipped with a pyramid deorbit sail. Formula (1) consists of formula (1-1), formula (1-2) and formula (1-3).

$$\begin{bmatrix} \dot{r} \\ \ddot{r} \end{bmatrix} = \begin{bmatrix} v \\ \ddot{r}_A + \ddot{r}_U \end{bmatrix} \quad (1\text{-}1)$$

$$T = I\dot{\omega}_b + \omega_b \times I\omega_b \quad (1\text{-}2)$$

$$\begin{cases} \dot{q} = \frac{1}{2}(q_0 \omega_b + q \times \omega_b) \\ \dot{q}_0 = -\frac{1}{2} q^T \omega_b \end{cases} \quad (1\text{-}3)$$

Where $\ddot{r}_A$ and $\ddot{r}_U$ respectively denote a perturbation acceleration induced under atmospheric resistance and a perturbation acceleration induced under gravitational force, I denotes a rotational inertia of a spacecraft, $\omega_b$ denotes an angular velocity of the spacecraft, and $Q=[q \ q_0]^T$ denotes a quaternion.

the struts and the thin-filmed sail surfaces of the pyramid deorbit sail both have a quantity of $n(n \geq 3)$, and the perturbation induced under atmospheric resistance on an $i(i=1, 2, \ldots, n)_{th}$ thin-filmed sail surface is expressed as follows:

$$F_{A,i} = -\frac{1}{2} c_d \rho A_{exp} (n_{Ii} \cdot v) v \quad (2)$$

Where $c_d$ denotes an atmospheric resistance coefficient, $\rho$ denotes an atmospheric density, $A_{exp}$ denotes an area of a sail surface exposed to airflow, v denotes a velocity of a spacecraft relative to the atmosphere, $n_{Ii}$ denotes an exterior normal unit vector of the sail surface in an inertial coordinate system, and m denotes mass of the spacecraft.

a perturbation acceleration of the spacecraft induced as a whole under atmospheric resistance is expressed as follows:

$$\ddot{r}_A = \frac{1}{m} \sum_{i=1}^{n} F_{A,i} \quad (3)$$

In low earth orbit, oblateness of earth is taken as a main influence factor on the non-spherical earth perturbation. Given that in a gravitational potential function, tesseral harmonics only affect short-period motion of the spacecraft, the tesseral harmonics are thus ignorable, only zonal harmonics $J_2$ need to be considered, and a perturbation acceleration induced under gravitational force is expressed as follows:

$$\ddot{r}_U = -\frac{\mu}{r^3} r - \frac{3}{2} J_2 \frac{\mu R_e^2}{r^5} r \quad (4)$$

Where $J_2$ denotes a zonal harmonic coefficient, $\mu$ denotes a gravitational constant, and $R_e$ denotes an earth radius.

aerodynamic torque acting on the spacecraft is yielded under noncoincidence in a center of pressure and a center of mass of the spacecraft, which is expressed as follows:

$$T_A = \sum_{i=1}^{n} (r_{CM,i} - r_{CM}) \times F_{Ab,i} \quad (5)$$

Where $r_{CM,i}$ denotes a position vector for a center of mass of each thin-filmed sail surface in a body coordinate system; and $r_{CM}$ denotes a position vector for a center of pressure of the deorbit sail in the body coordinate system; and $F_{Ab,i}$ denotes atmospheric resistance exerted on each thin-filmed sail surface in the body coordinate system.

The center of mass of each triangular thin-filmed sail surface is also a geometric gravity center of the triangle, namely an average position of three vertices. For example, the center of mass of the sail surface OAB in the body coordinate system is expressed as follows:

$$r_{CM,OAB} = \frac{1}{3}(r_O + r_A + r_B) \tag{6}$$

Where $r_{()}$ denotes a position vector of point ( ) in the body coordinate system.

The center of pressure of the spacecraft is dependent merely on the thin-filmed sail surface, the thin-filmed sail is made of a homogeneous material with a surface density of $\sigma_m$, and the mass of a strut per unit length is denoted as $\rho_b$. In order to simplify the amount of calculation, the mass of the strut is allocated to the thin-filmed sail surface as an equivalent form of surface density of the deorbit sail, which is expressed as follows:

$$\sigma = \frac{nA\sigma_m + nl\rho_b}{nA} \tag{7}$$

Where a geometric area of the thin-filmed sail surface is expressed as $$A = \frac{b}{4}\sqrt{4l^2 - b^2}, \text{ and } b = 2\sin\frac{\pi}{n}l\sin\theta.$$

l denotes a strut length of the deorbit sail, b denotes a distance between tops of two struts, and θ denotes an included angle between the strut and a $y_b$ axis, which is also known as a cone angle of the deorbit sail, and is within a range of (0°,90°).

When the spacecraft body is simplified to a mass point with mass $m_s$, and located at an origin of the body coordinate system, total mass of the spacecraft is expressed as follows:

$$m = nA\sigma + m_s \tag{8}$$

A position of the center of mass of the spacecraft in the body coordinate system is expressed as follows:

$$r_{CM} = \frac{\sum_{i=1}^{n} r_{CM,i} \sigma A}{m} \tag{9}$$

Besides, gravity gradient torque is also imparted on the spacecraft, and is expressed as follows:

$$T_U = \frac{3\mu}{r_b^3}\left(\frac{-r_b}{r_b} \times I \frac{-r_b}{r_b}\right) \tag{10}$$

Where $r_b$ denotes a position vector of the spacecraft in the body coordinate system.

Given the symmetry, the principal inertia axes of the spacecraft are aligned with the body coordinate axes. A random junior unit R on the sail surface is taken, and a position thereof is described with (s, t), where s is along an edge of the sail surface, and t is parallel to a base of the sail surface.

Coordinates of the random junior unit R on the sail surface in the body coordinate system are as follows:

$$r_R = \begin{bmatrix} \sin\theta \\ -\cos\theta \\ 0 \end{bmatrix} s + \begin{bmatrix} -\sin\theta \\ 0 \\ \sin\theta \end{bmatrix} \frac{l}{b} t \tag{11}$$

Based on the foregoing coordinates, a distance from the random junior unit R on the sail surface to each of the three principal inertia axes is expressed as follows:

$$d_x^2 = r_{R,z}^2 + (r_{R,y} - r_{CM,y})^2$$

$$d_y^2 = r_{R,z}^2 + r_{R,x}^2$$

$$d_z^2 = r_{R,x}^2 + (r_{R,y} - r_{CM,y})^2 \tag{12}$$

The obtained distances are substituted to an expression for rotational inertia of the sail surface to obtain rotational inertia of the thin-filmed sail surface i as follows:

$$I_i = \int_A \sigma d^2 dA = \int_0^l \int_0^{\frac{b}{l}s} \sigma d^2 \sqrt{1 - b^2/(4l^2)}\, dt ds \tag{13}$$

Given symmetry, every triangular sail surface's moment of inertia relative to the spacecraft's inertial principal axis is calculated in the same way, from which principal rotational inertia of the spacecraft is derived as follows:

$$I_x = nI_{i,x} + m_s r_{CM,y}^2 + I_{s,x}$$

$$I_y = nI_{i,y} + I_{s,y}$$

$$I_z = nI_{i,z} + m_s r_{CM,y}^2 + I_{s,z} \tag{14}$$

Where $I_s$ denotes rotational inertia of the spacecraft body.

When airflow is obstructed by a sail surface lying in the front among the thin-filmed sail surfaces of the pyramid deorbit sail, the influence of atmospheric resistance on the sail surface in the back is ignorable, and merely the area of the sail surfaces exposed to the airflow needs to be considered when calculating the atmospheric resistance perturbation. By combining factors such as the influence of the windward area of the sail surface in the case of airflow obstruction on the atmospheric resistance exerted on the pyramid deorbit sail, and the further influence of the windward area of the sail surface in the case of airflow obstruction on the orbit and attitude of the pyramid deorbit sail, the precision of the pyramid deorbit sail system-oriented dynamics model featuring three-dimensional orbit-and-attitude coupling is improved.

In case of a small initial orbit inclination, the spacecraft makes attitude motion mainly in an orbital plane, and therefore, airflow obstruction occurs only in the orbital plane. A direction of the spacecraft relative to the airflow is indicated with an angle of direction, where the angle of direction α is an included angle between a $y_b$ axis and a velocity v, and is within a range of [−π,π]. When $$\alpha \in \left(-\pi + \theta, -\frac{\pi}{2}\right) \cup \left(\frac{\pi}{2}, \pi - \theta\right),$$

the sail surface is likely to be obstructed in part. According to the symmetry and a geometric relationship in the deorbit sail, an airflow exposure area $A_{exp}$ is obtained as n varies in value, where when n→∞, the deorbit sail is approximated to a pyramid deorbit sail, which is expressed as follows.

$$A_{exp,n=3} = 3A - \left[\frac{\sin(|\alpha|+\theta)}{\sin(|\alpha|-\theta)}\right]A \qquad (15)$$

$$A_{exp,n=4} = 4A - \left[\frac{2\sin(|\alpha|+\theta)}{\sin(|\alpha|-\theta)}\right]A$$

$$A_{exp,n=5} = 4A - \frac{\sin(|\alpha|+\theta)}{\sin(|\alpha|-\theta)}A - \frac{l^2}{2}\sin(2\varphi)\frac{\sin(|\alpha|+\theta)\sin(|\alpha|+\varphi)}{\sin(|\alpha|-\theta)\sin(|\alpha|-\varphi)}$$

$$A_{exp,n=6} = 6A - \left[\frac{2\sin(|\alpha|+\theta)}{\sin(|\alpha|-\theta)} + \frac{\sin^2(|\alpha|+\theta)}{\sin^2(|\alpha|-\theta)}\right]A$$

$$\vdots$$

$$A_{exp,n\to\infty} = \int_0^{\lambda l}\int_{\kappa_\alpha}^{\pi}s d\kappa ds + \int_{\lambda l}^{l}\int_0^{\kappa_\alpha}s d\kappa ds$$

Where $$\varphi = \arcsin\frac{b}{2l},$$

$\kappa_\alpha$=arccos(tan θ cot θ), κ denotes a circumferential angle of the pyramid deorbit sail, and λ denotes a radial limit of airflow impact on the deorbit sail.

With the environmental perturbation like atmospheric resistance perturbation and non-spherical earth perturbation taken into consideration, the pyramid deorbit sail system-oriented dynamics model featuring three-dimensional orbit-and-attitude coupling is established based on the position vectors and quaternion descriptions, where the pyramid deorbit sail system-oriented dynamics model featuring three-dimensional orbit-and-attitude coupling is shown in formula (1); and by considering, according to formula (15), the factors such as the influence of the windward area of the sail surface in the case of airflow obstruction on atmospheric resistance exerted on the pyramid deorbit sail and the further influence of the windward area of the sail surface in the case of airflow obstruction on the orbit and attitude of the pyramid deorbit sail in the model establishing process the precision of the pyramid deorbit sail system-oriented dynamics model featuring three-dimensional orbit-and-attitude coupling is improved.

step 2, analyzing, according to a control variate method, to derive a law of influence of parameters such as a cone angle and a strut length in the pyramid deorbit sail on attitude stability and deorbiting efficiency of a spacecraft in different cases based on the pyramid deorbit sail system-oriented dynamics model featuring three-dimensional orbit-and-attitude coupling considering airflow obstruction obtained in step 1, and optimizing configuration parameters of the pyramid deorbit sail system based on the law to obtain a pyramid deorbit sail configuration achieving high attitude stability and high deorbiting efficiency and hence improved attitude stability and deorbiting efficiency of the spacecraft.

Preferably, said analyzing to derive a law of influence of a cone angle and a strut length in the pyramid deorbit sail on the attitude stability and deorbiting efficiency of the spacecraft by considering the influence of parameters in the deorbit sail on attitude stability and deorbiting efficiency of a spacecraft in different cases specifically includes the following.

In case I of a same initial orbit altitude of the spacecraft, and a same maximum area-mass ratio but different cone angles for the pyramid deorbit sail, selecting configuration parameters of the pyramid deorbit sail system yielding a minimum difference in rotational inertia components of the spacecraft to realize optimal configuration construction for the pyramid deorbit sail.

In case II of a same initial orbit altitude of the spacecraft, and a same maximum area-mass ratio but different cone angles for the pyramid deorbit sail, given that the attitude stability and the deorbiting efficiency of the spacecraft first increase and then decrease along with the increase of the cone angle of the deorbit sail, balancing the attitude stability and the maximum area-mass ratio of the spacecraft to obtain the optimal cone angle of the deorbit sail and thus realize the optimal configuration construction for the pyramid deorbit sail.

In case III of a same initial orbit altitude of the spacecraft, and a same cone angle as well as a same strut length for the pyramid deorbit sail, given that the strut length has little impact on the attitude stability, focusing mainly on the design of the cone angle, selecting a cone angle of the pyramid deorbit sail yielding a minimum difference in rotational inertia components of the spacecraft to realize optimal configuration construction for the pyramid deorbit sail.

In case IV of different initial orbit altitudes of the spacecraft and a same cone angle as well as a same strut length for the pyramid deorbit sail, given that the larger the orbit altitude of the spacecraft is, the lower the spacecraft stability becomes, selecting a deorbit sail with a large cone angle to reduce the influence of orbit altitudes on attitude stability and thus realize the optimal configuration construction for the pyramid deorbit sail.

The present disclosure further provides an attitude control method for a pyramid deorbit sail implemented, including step 1 and step 2 of the configuration construction method for a pyramid deorbit sail. The attitude control method further includes step 3: based on the configuration parameters of the pyramid deorbit sail achieving high attitude stability and high deorbiting efficiency obtained in step 2, designing a quaternion feedback-based repositioning control law for the pyramid deorbit sail, considering transfer of a velocity coordinate system with respect to the body coordinate system in the quaternion feedback-based repositioning control law to develop a quaternion feedback-based repositioning Proportional-Integral-Derivative Control (PID) control law for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

In the quaternion feedback-based repositioning control law, a linear state feedback controller is used for achieving attitude maneuver of the spacecraft, and a gyroscopic term about moment of inertia is directly offset by the control torque, where the control law is expressed as follows:

$$u = -Kq_e - C\omega_b + \omega_b \times I\omega_b \qquad (16)$$

Where $q_e = [q_{1e}\ q_{2e}\ q_{3e}]^T$ denotes a vector or of an attitude error quaternion, and K and C each denote a controller gain matrix. An attitude error quaternion $[q_{1e}\ q_{2e}\ q_{3e}\ q_{0e}]^T$ is calculated from a command attitude quaternion $[q_{1e}\ q_{2e}\ q_{3e}\ q_{0e}]^T$ and a current attitude quaternion $[q_1\ q_2\ q_3\ q_0]^T$, according to the following formula:

$$\begin{cases} q_e = q_{0c}q - q_0q_c + q \times q_c \\ q_{0e} = q_{0c}q_0 + q_c^T q \end{cases} \qquad (17)$$

If a matrix $K^{-1}C$ is positive definite, an origin of a closed-loop system with a controller is globally asymptotically stable. Therefore, K=kI and C=cI are chosen, the algorithm uses scaling of rotational inertia and a derivative gain matrix to reduce overshoot of the controller and make the system globally asymptotically stable.

At this time, a proportional differential control law is expressed as follow:

$$u = -kq_e - c\omega_b + \omega_b \times I\omega_b \quad (18)$$

Where a gain coefficient k and a damping coefficient c are functions of a systematic intrinsic frequency and a damping ratio required, and are defined as follows:

$$k = 2\omega_n^2, \ c = 2\omega_n \xi$$

Where $\omega_n$ denotes a systematic intrinsic frequency, and $\xi$ denotes a damping ratio.

a reaction wheel is selected as an actuator, when a rotational speed of the reaction wheel reaches a certain extreme state, the reaction wheel stops absorbing excess moment of momentum from the spacecraft and is in a saturated mode, at this moment, the spacecraft is left out of control, and restrictions are supposed to be imposed on actual torque and angular momentum of a control system. The angular momentum of the reaction wheel is calculated from an equation of state of the reaction wheel as follows:

$$\dot{H}_{RW} = -u - \omega_b \times H_{RW} \quad (19)$$

Where $H_{RW}$ denotes angular momentum of the reaction wheel.

In this case, both the spacecraft and a flywheel ought to be considered in an attitude dynamics model.

$$T = I\dot{\omega}_b + \dot{H}_{RW} + \omega_b \times (I\omega_b + H_{RW}) \quad (20)$$

In order to maneuver the attitude of the pyramid deorbit sail system from any angle to a direction corresponding to the maximum windward area and maintain stability, it is necessary to set the command attitude quaternion in the attitude controller to an attitude quaternion corresponding to an angle of direction of 0°.

In order to accurately describe a size and a direction of the angle of direction, a velocity coordinate system $x_o y_o z_o$ is established, with an origin of the coordinate system being a center of mass of the spacecraft; a $y_o$ axis coincides with the velocity direction of the spacecraft, an $x_o$ axis is perpendicular to the $y_o$ axis in the orbital plane, and a direction at which the center of the earth points to the origin of the coordinate system is taken as a positive direction; and a $z_o$ axis conforms to the right-hand rule. The angle of direction being kept at 0° is indicative of coincidence between the spacecraft body coordinate system and the velocity coordinate system.

A quaternion feedback-based repositioning control method is adopted, and attitude parameters of the spacecraft body coordinate system with respect to the velocity coordinate system are described using quaternions, which is expressed as follows:

$$\begin{cases} \dot{q} = \frac{1}{2}(q_0 \omega_{bo} + q \times \omega_{bo}) \\ \dot{q}_0 = -\frac{1}{2} q^T \omega_{bo} \end{cases} \quad (21)$$

Where $\omega_{bo}$ denotes an angular velocity vector of the body coordinate system relative to the velocity coordinate system, and satisfies a relational expression $\omega_{bo} = \omega_b - C_{x_b x_o} \omega_o$; and $\omega_o$ denotes a projection of an orbital angular velocity of the spacecraft in the velocity coordinate system, which is calculated according to the following formula:

$$\omega_o = \frac{|v|}{|r|} \cdot \begin{bmatrix} 0 \\ 0 \\ 1 \end{bmatrix} \quad (22)$$

$C_{x_b x_o}$ denotes a transformation matrix from the body coordinate system to the velocity coordinate system, which is expressed as follows:

$$C_{x_b x_o} = \begin{bmatrix} q_0^2 + q_1^2 - q_2^2 - q_3^2 & 2(q_1 q_2 + q_0 q_3) & 2(q_1 q_3 - q_0 q_2) \\ 2(q_1 q_2 - q_0 q_3) & q_0^2 - q_1^2 + q_2^2 - q_3^2 & 2(q_0 q_1 + q_2 q_3) \\ 2(q_1 q_3 + q_0 q_2) & 2(q_2 q_3 - q_0 q_1) & q_0^2 - q_1^2 - q_2^2 + q_3^2 \end{bmatrix} \quad (23)$$

Given that the transformation matrix $C_{x_o X}$ from the velocity coordinate system to the inertial coordinate system is merely associated with orbit information, which is expressed as follows:

$$C_{x_o X} = \begin{bmatrix} \frac{v}{|v|} \times \frac{r \times v}{|r \times v|} & \frac{v}{|v|} & \frac{r \times v}{|r \times v|} \end{bmatrix}^T \quad (24)$$

A transformation matrix $C_{x_b X} = C_{x_b x_o} C_{x_o X}$ from the body coordinate system to the inertial coordinate system is as follows.

In order to make the spacecraft body coordinate system coincide with the velocity coordinate system, the command attitude quaternion is set to $[0\ 0\ 0\ 1]^T$, and the quaternions of the current body coordinate system and velocity coordinate system are controlled using the quaternion feedback-based repositioning control law.

However, given the distinction of $\omega_b$ and $\omega_{bo}$ in the control law, it is necessary to offset a static difference using an integral term, that is, a complete PID controller is required as follows.

$$u = -kq_e - c\omega_b - k_i \int q_e + \omega_b \times I\omega_b \quad (25)$$

Where $k_i$ denotes an integral term-related parameter.

Based on the configuration parameters of the pyramid deorbit sail achieving high attitude stability and high deorbiting efficiency obtained in step 2, and the pyramid deorbit sail system-oriented dynamics model featuring three-dimensional orbit-and-attitude coupling considering airflow obstruction established in step 1, transfer of the velocity coordinate system with respect to the body coordinate system is considered in the quaternion feedback-based repositioning control law to develop the quaternion feedback-based repositioning PID control law as shown in formula (25) for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

Beneficial Effects

1. The configuration construction method for a pyramid deorbit sail includes establishing a pyramid deorbit sail system-oriented dynamics model featuring three-dimensional orbit-and-attitude coupling based on position vectors and quaternion descriptions, and considering, in the pyramid deorbit sail system-oriented dynamics model featuring three-dimensional orbit-and-attitude coupling, factors such as the influence of a windward area of a sail surface in the case of airflow obstruction on atmospheric resistance exerted on the pyramid deorbit sail and the further influence of the windward area of the sail surface in the case of airflow obstruction on an orbit and an attitude of the pyramid deorbit sail so as to improve precision of the pyramid deorbit sail system-oriented dynamics model featuring three-dimensional orbit-and-attitude coupling.

2. The configuration construction method for a pyramid deorbit sail includes further includes analyzing, according to a control variate method, to derive a law of influence of parameters such as a cone angle and a strut length in the pyramid deorbit sail on attitude stability and deorbiting efficiency of a spacecraft in different cases based on the pyramid deorbit sail system-oriented dynamics model featuring three-dimensional orbit-and-attitude coupling considering airflow obstruction, and optimizing configuration parameters of the pyramid deorbit sail system based on the law to obtain a pyramid deorbit sail configuration achieving high attitude stability and high deorbiting efficiency and hence improved attitude stability and deorbiting efficiency of the spacecraft.

Said analyzing to derive a law of influence of a cone angle and a strut length in the pyramid deorbit sail on the attitude stability and deorbiting efficiency of the spacecraft by considering the influence of parameters in the deorbit sail on attitude stability and deorbiting efficiency of a spacecraft in different cases specifically includes the following.

In case of a same initial orbit altitude of the spacecraft, and a same maximum area-mass ratio but different cone angles for the pyramid deorbit sail, selecting configuration parameters of the pyramid deorbit sail system yielding a minimum difference in rotational inertia components of the spacecraft; in case of a same orbit altitude, and a same maximum area-mass ratio but different cone angles, given that the attitude stability and the deorbiting efficiency of the spacecraft first increase and then decrease along with the increase of the cone angle of the deorbit sail, balancing the attitude stability and the maximum area-mass ratio of the spacecraft to obtain the optimal cone angle of the deorbit sail; in case of a same orbit altitude, and a same cone angle as well as a same strut length, given that the strut length has little impact on the attitude stability, focusing mainly on the design of the cone angle, selecting a cone angle of the pyramid deorbit sail yielding a minimum difference in rotational inertia components of the spacecraft; and in case of different orbit altitudes and a same cone angle as well as a same strut length, given that the larger the orbit altitude of the spacecraft is, the lower the spacecraft stability becomes, selecting a deorbit sail with a large cone angle to reduce the influence of orbit altitudes on attitude stability. Configuration parameters of the pyramid deorbit sail are selected according to the foregoing suggestion, so as realize optimal configuration construction for the pyramid deorbit sail.

3. The attitude control method for a pyramid deorbit sail is implemented based on the configuration construction method for a pyramid deorbit sail to obtain a pyramid deorbit sail achieving high attitude stability and high deorbiting efficiency, including: based on the optimized configuration parameters of the pyramid deorbit sail, designing a quaternion feedback-based repositioning control law for the pyramid deorbit sail, considering transfer of a velocity coordinate system with respect to the body coordinate system in the quaternion feedback-based repositioning control law to develop a quaternion feedback-based repositioning Proportional-Integral-Derivative Control (PID) control law for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

BRIEF DESCRIPTION OF THE DRAWINGS

FIG. 10A shows a curve illustrating change of an angle of direction over time for a spacecraft equipped with a pyramid deorbit sail when an attitude stability controller is in use,
and FIG. 10B shows a curve illustrating change of an angle of direction over time for a spacecraft equipped with a pyramid deorbit sail when an attitude stability controller is not in use.

DETAILED DESCRIPTION OF THE EMBODIMENTS

In order to well illustrate the technical details of the present disclosure, the specific implementation of the configuration construction and attitude control method for a pyramid deorbit sail will be further described in detail below with a specific embodiment.

Embodiment 1

Assume that the spacecraft body is a cube satellite with a side length of 0.01 m and a mass of 1 kg; a pyramid deorbit sail has 4 struts and 4 thin-filmed sail surfaces, the surface density of the thin-filmed sail surface is 13.2 g/m², and the linear density of the strut is 16.3 g/m; the initial angular velocity is 0; the initial attitude is $y_b$ which is coincident with the velocity direction; the initial number of orbits for the spacecraft relative to the inertial coordinate system is [a e i $\Omega$ ω f]$_0$=[6971-7171 km 0.005 0.1° 270° 90° 0°]; the strut length and the maximum area-mass ratio of the pyramid deorbit sail are constants with a value of l=1 m and a value of $AMR_{max}$=b²/m=0.9 m²/kg respectively; NRLMSISE-00 model is adopted as atmospheric density model, the atmospheric resistance coefficient is $C_d$=2.2, and Apr. 1, 2014 is selected as the initial deorbit time so as to calculate the atmospheric resistance at the corresponding moment; the controller is set to have critical damping (that is, a damping ratio of ξ=1), and an intrinsic frequency of $\omega_n$=0.35; the integral term-related parameter $k_i$ has a value of 0.01; the actuator adopts a 10 SP-M miniature three-axis reaction wheel system, the reaction wheel reaches a saturated state when angular momentum is ±0.42 N·m·s, and the control torque is limited within a range of ±6 mN·m, which is 60% of the maximum torque ±10 mN·m that can be provided by the 10 SP-M; and when the attitude control system needs to be verified, an Euler angle [$\gamma_0$ $\Psi_0$ $\delta_0$]=[0° 0.1° 15°] of the body coordinate system relative to the velocity coordinate system is taken.

The configuration construction and attitude control method for a pyramid deorbit sail is specifically implemented as follows.

Figure 1:
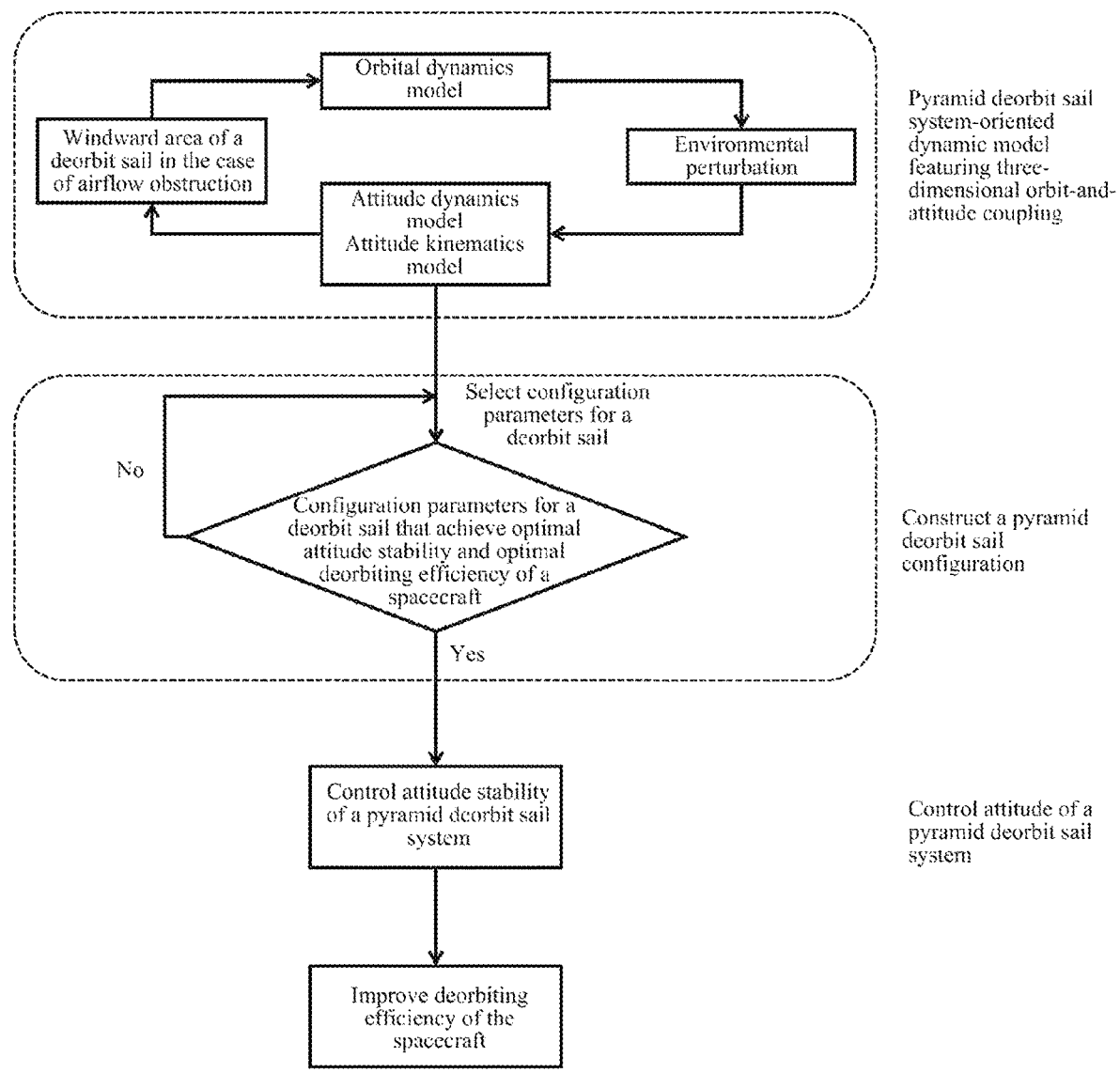
FIG. 1 is a flowchart according to the present disclosure.
Figure 2:
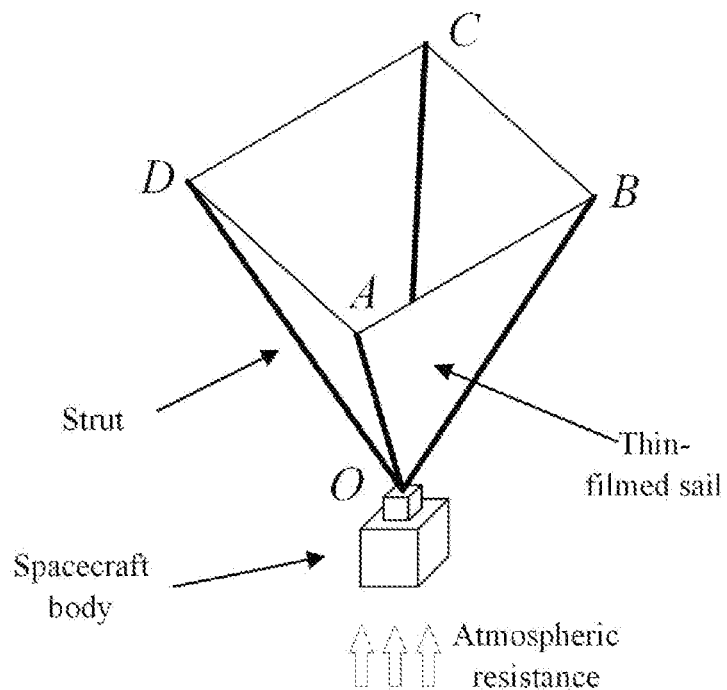
FIG. 2 is a schematic view of a pyramid deorbit sail device when n=4.
Figure 3:
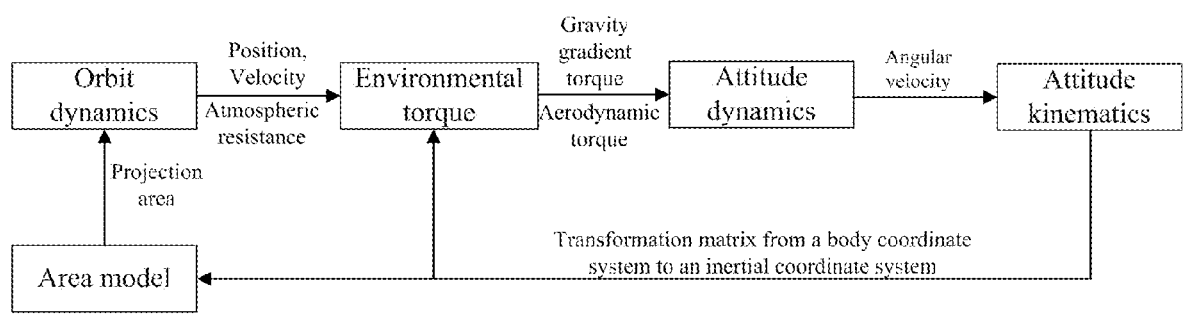
FIG. 3 is a schematic view of a dynamics model for a spacecraft equipped with a pyramid deorbit sail.

Step 1, with environmental perturbation like atmospheric resistance perturbation and non-spherical earth perturbation taken into consideration, establish a pyramid deorbit sail system-oriented dynamics model featuring three-dimensional orbit-and-attitude coupling based on position vectors and quaternion descriptions, and consider, in the pyramid deorbit sail system-oriented dynamics model featuring three-dimensional orbit-and-attitude coupling, factors such as the influence of a windward area of a sail surface in the case of airflow obstruction on atmospheric resistance exerted on the pyramid deorbit sail and the further influence of the windward area of the sail surface in the case of airflow obstruction on an orbit and an attitude of the pyramid deorbit sail so as to improve precision of the pyramid deorbit sail system-oriented dynamics model featuring three-dimensional orbit-and-attitude coupling;

Firstly, calculate parameters such as center of mass, center of pressure, and rotational inertia of the spacecraft equipped with a pyramid deorbit sail, and substitute the calculated parameters into a deorbit sail system-oriented dynamics model featuring attitude-and-orbit coupling, where the attitude change of the spacecraft will alter the windward area of the deorbit sail, which accordingly changes the effect of atmospheric resistance perturbation on the orbit; while the change of the orbit altitude will alter the atmospheric density, which in turn changes the aerodynamic torque perturbation on the deorbit sail, and affects the attitude of the spacecraft. FIG. 1 is a flowchart according to the present disclosure, FIG. 2 is a schematic view of a pyramid deorbit sail device when n=4; and FIG. 3 is a schematic view of a dynamics model for a spacecraft equipped with a pyramid deorbit sail.

Step 2: analyze, according to a control variate method, to derive a law of influence of parameters such as a cone angle and a strut length in the pyramid deorbit sail on attitude stability and deorbiting efficiency of a spacecraft in different cases based on the pyramid deorbit sail system-oriented dynamics model featuring three-dimensional orbit-and-attitude coupling considering airflow obstruction obtained in Step 1, and optimize configuration parameters of the pyramid deorbit sail system based on the law to obtain a pyramid deorbit sail configuration achieving high attitude stability and high deorbiting efficiency and hence improved attitude stability and deorbiting efficiency of the spacecraft.

Preferably, the influence of parameters in the deorbit sail on attitude stability and deorbiting efficiency of a spacecraft mainly covers four different cases:

case I of a same initial orbit altitude of the spacecraft, and a same maximum area-mass ratio but different cone angles for the pyramid deorbit sail;

case II of a same initial orbit altitude of the spacecraft, and a same maximum area-mass ratio but different cone angles for the pyramid deorbit sail;

case III of a same initial orbit altitude of the spacecraft, and a same cone angle as well as a same strut length for the pyramid deorbit sail; and case IV of different initial orbit altitudes of the spacecraft and a same cone angle as well as a same strut length for the pyramid deorbit sail.

Figure 4:
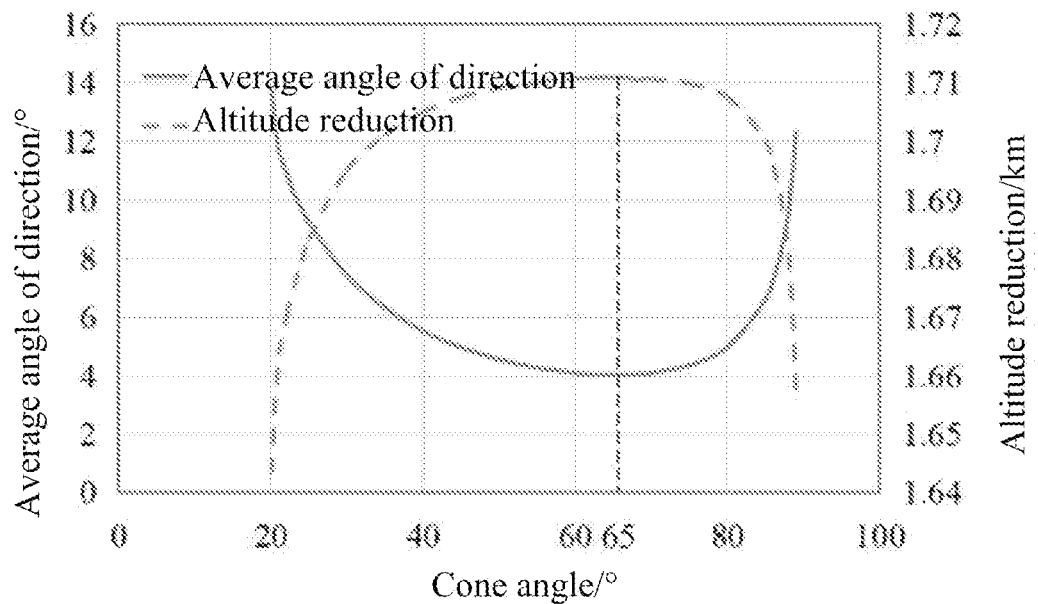
FIG. 4 shows a curve illustrating change of an average angle of direction of a spacecraft and orbital altitude reduction over a cone angle in case of a same initial orbit altitude, and a same maximum area-mass ratio for a pyramid deorbit sail.
Figure 5:
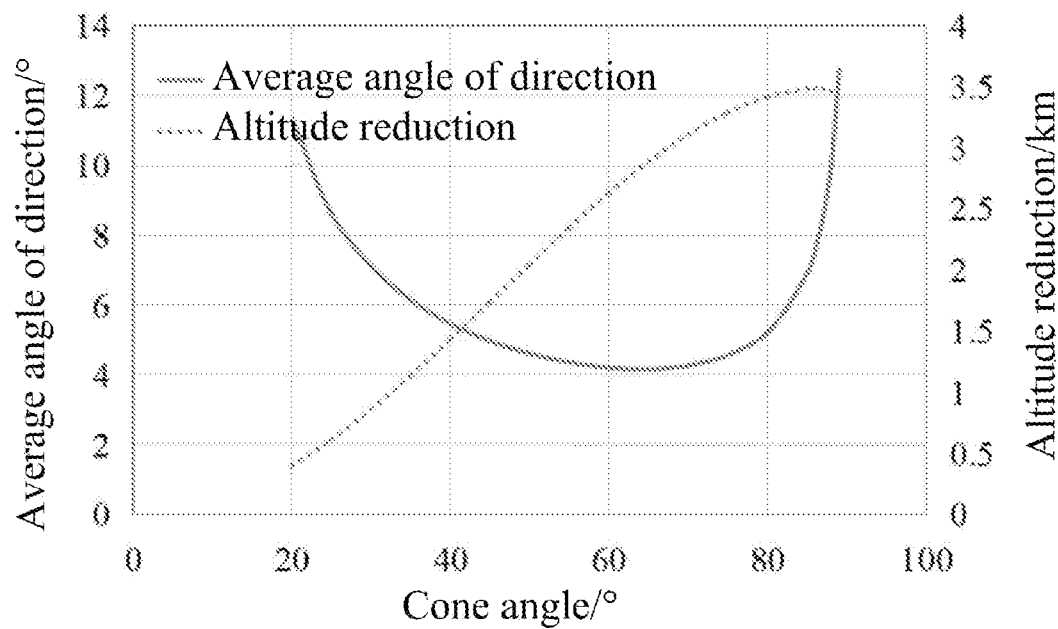
FIG. 5 shows a curve illustrating change of an average angle of direction and orbital altitude reduction of a spacecraft over a cone angle in case of a same initial orbit altitude, and a same strut length for a pyramid deorbit sail.
Figure 6:
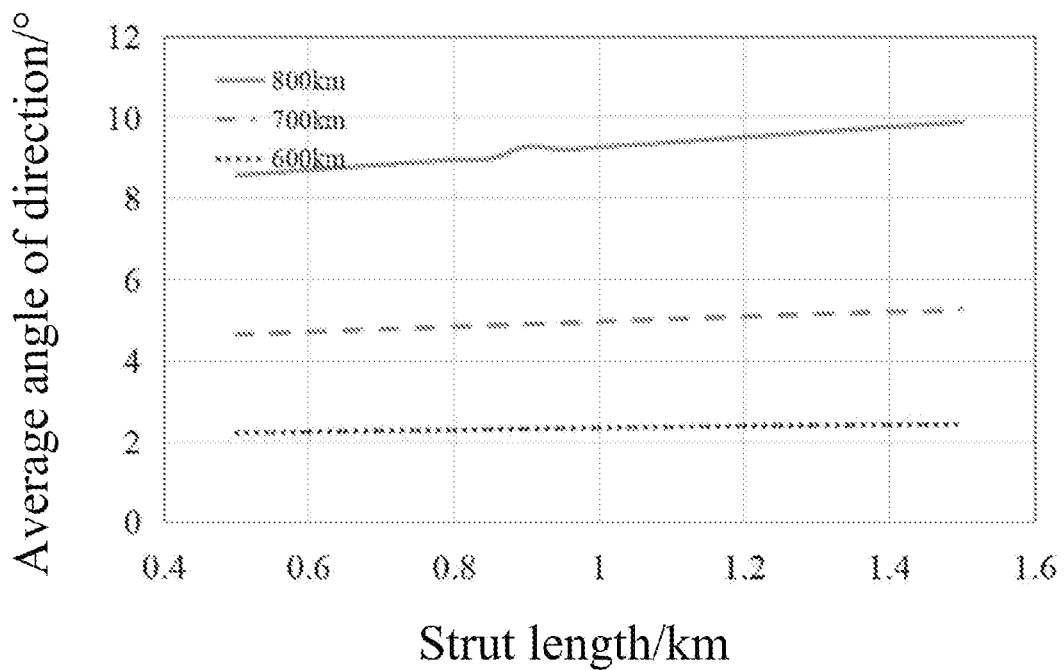
FIG. 6 shows a curve illustrating change of an average angle of direction of a spacecraft over a strut length of a deorbit rail in case of a same initial orbit altitude (semi-major axis) and a same cone angle for a pyramid deorbit sail.
Figure 7:
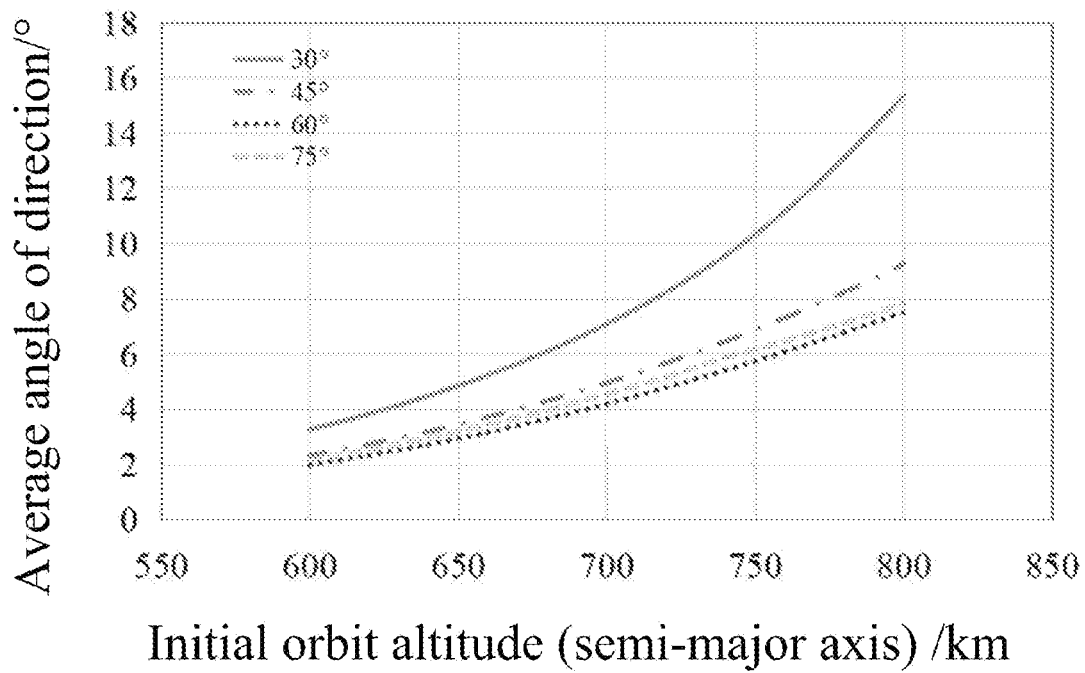
FIG. 7 shows a curve illustrating change of an average angle of direction of a pyramid deorbit sail with a same configuration over time when at different initial orbital semi-major axes.

FIG. 4 shows a curve illustrating change of an average angle of direction of a spacecraft and orbital altitude reduction over a cone angle in case of a same initial orbit altitude, and a same maximum area-mass ratio for a pyramid deorbit sail; FIG. 5 shows a curve illustrating change of an average angle of direction and orbital altitude reduction of a spacecraft over a cone angle in case of a same initial orbit altitude, and a same strut length for a pyramid deorbit sail; FIG. 6 shows a curve illustrating change of an average angle of direction of a spacecraft over a strut length of a deorbit rail in case of a same initial orbit altitude (semi-major axis) and a same cone angle for a pyramid deorbit sail; and FIG. 7 shows a curve illustrating change of an average angle of direction of a pyramid deorbit sail with a same configuration over time when at different initial orbital semi-major axes.

Analyze to derive a law of influence of a cone angle and a strut length in the pyramid deorbit sail on the attitude stability and deorbiting efficiency of the spacecraft. In this way, configuration construction for a pyramid deorbit sail system can be achieved. In case of a same initial orbit altitude of the spacecraft, and a same maximum area-mass ratio for the deorbit sail, select a configuration scheme yielding a minimum difference in rotational inertia components of the spacecraft, and at this moment, the optimal cone angle of the deorbit sail is 65°; in case of a same orbit altitude, and a same strut length, balance the attitude stability and the maximum area-mass ratio of the spacecraft to obtain the optimal cone angle of the deorbit sail, and at this moment, the optimal cone angle of the deorbit sail is 86°; when the attitude stability of the spacecraft, given that the strut length has little impact on the stability, focus mainly on the design of the cone angle; and given that the higher the orbit altitude is, the lower the spacecraft stability becomes, select a deorbit sail with a large cone angle to reduce the influence of orbit altitudes on attitude stability.

Step 3: based on the configuration parameters of the pyramid deorbit sail achieving high attitude stability and high deorbiting efficiency obtained in step 2, design a quaternion feedback-based repositioning control law for the pyramid deorbit sail, consider transfer of a velocity coordinate system with respect to the body coordinate system in the quaternion feedback-based repositioning control law to develop a quaternion feedback-based repositioning Proportional-Integral-Derivative Control (PID) control law for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

Figure 8:
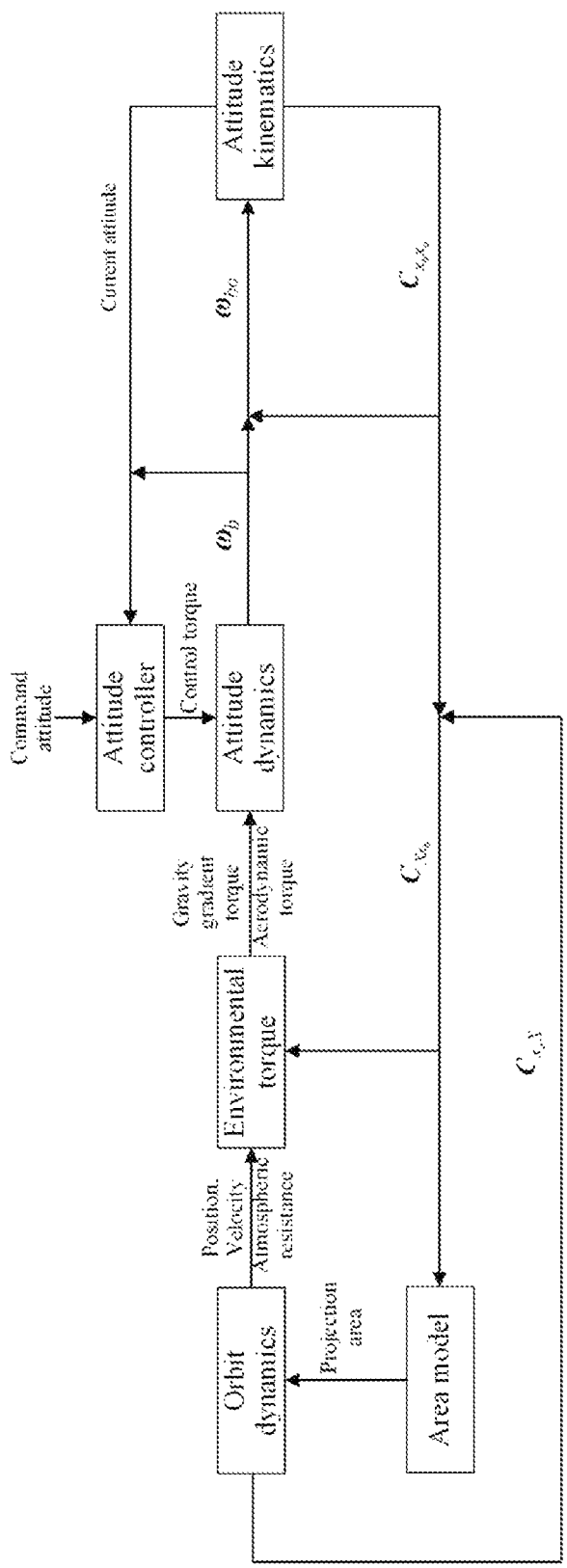
FIG. 8 is a schematic view of an attitude control system for a spacecraft equipped with a pyramid deorbit sail.
Figure 9:
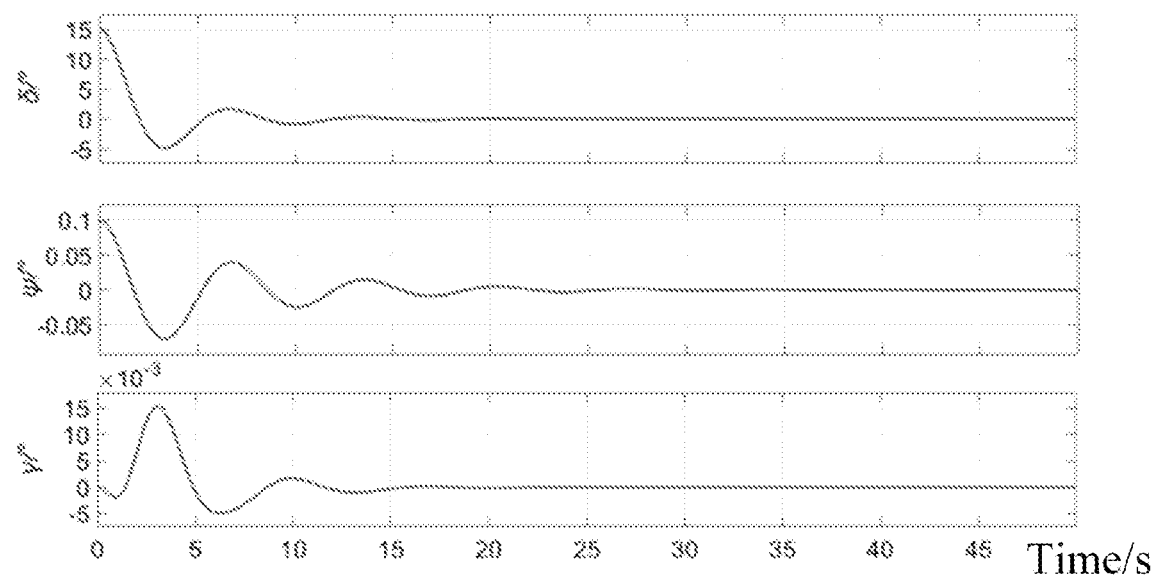
FIG. 9 shows a curve illustrating change of Euler angles of a body coordinate system with respect to a velocity coordinate system over time for a spacecraft equipped with a pyramid deorbit sail under the action of an attitude control system.
Figure 10A:
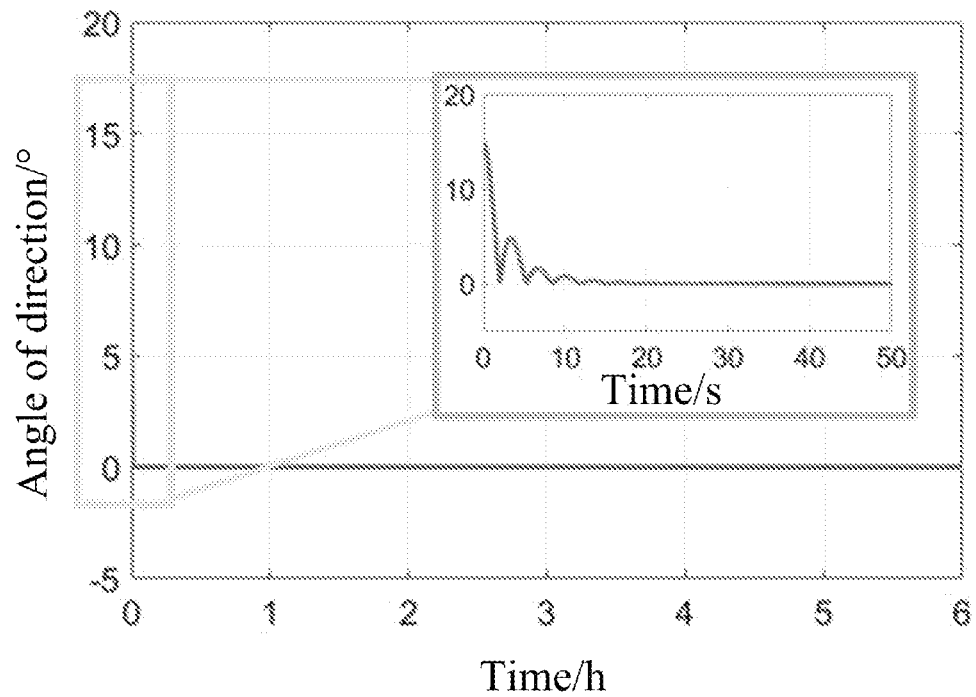
FIG. 10A-B show curve illustrating changes of an angle of direction over time for a spacecraft equipped with a pyramid deorbit sail when an attitude stability controller is either in use or not, where
Figure 10B:
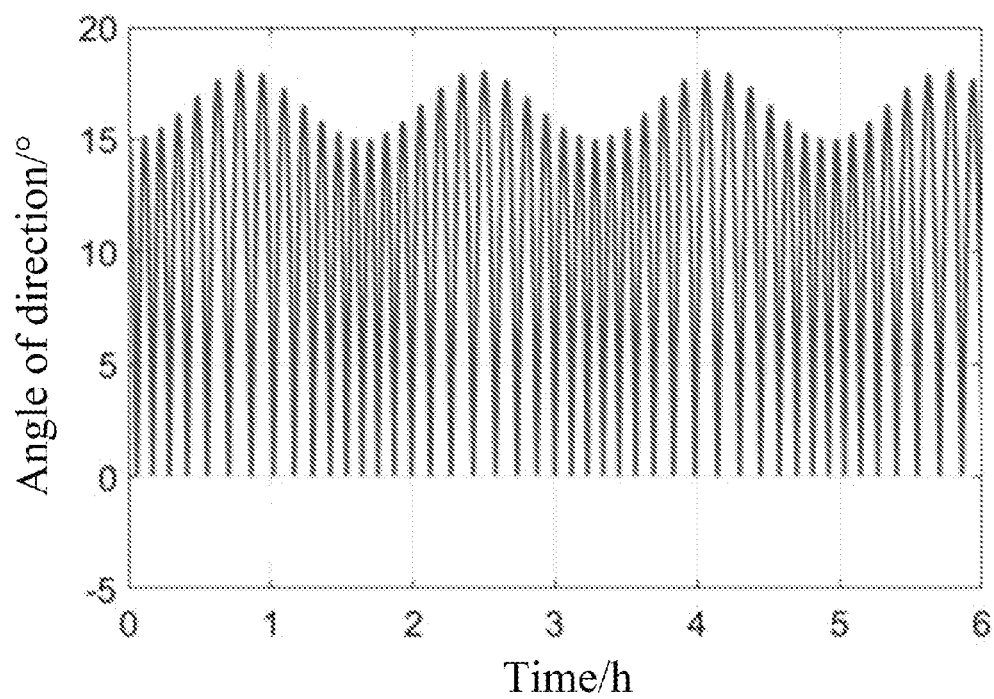

FIG. 8 is a schematic view of an attitude control system for a spacecraft equipped with a pyramid deorbit sail; FIG. 9 shows a curve illustrating change of Euler angles of a body coordinate system with respect to a velocity coordinate system over time for a spacecraft equipped with a pyramid deorbit sail under the action of an attitude control system; and FIG. 10A-B show curve illustrating changes of an angle of direction over time for a spacecraft equipped with a pyramid deorbit sail when an attitude stability controller is either in use or not, where FIG. 10A shows a curve illustrating change of an angle of direction over time for a spacecraft equipped with a pyramid deorbit sail when an attitude stability controller is in use, and FIG. 10B shows a curve illustrating change of an angle of direction over time for a spacecraft equipped with a pyramid deorbit sail when an attitude stability controller is not in use.

The attitude controller can turn the sail surface of the pyramid deorbit sail towards a maximum windward area and maintain the state within 45 s. A controlled system can make the orbit altitude reduction be 15 km greater than the uncontrolled system does in 5 years, that is, it can reduce the orbit altitude more effectively than the uncontrolled system in the same period.

With the above described technical details and control algorithms, the configuration construction and attitude control method for the pyramid deorbit sail used for deorbiting a spacecraft at the end of its life or after the completion of a mission are finally realized, which improves the deorbiting efficiency of spacecraft.

The foregoing are merely descriptions of preferred embodiments of the present disclosure, and are not intended to limit the protection scope of the present disclosure. Any modifications, equivalent substitutions, improvements, and the like made within the spirit and principle of the present disclosure should be included within the protection scope of the present disclosure.

What is claimed is:

1. A configuration construction method for a pyramid deorbit sail, comprising the following steps:
   step 1, with environmental perturbation like atmospheric resistance perturbation and non-spherical earth perturbation taken into consideration, establishing a pyramid deorbit sail system-oriented dynamics model featuring three-dimensional orbit-and-attitude coupling based on position vectors and quaternion descriptions, and considering, in the pyramid deorbit sail system-oriented dynamics model featuring three-dimensional orbit-and-attitude coupling, factors such as the influence of a windward area of a sail surface in the case of airflow obstruction on atmospheric resistance exerted on the pyramid deorbit sail and the further influence of the windward area of the sail surface in the case of airflow obstruction on an orbit and an attitude of the pyramid deorbit sail so as to improve precision of the pyramid deorbit sail system-oriented dynamics model featuring three-dimensional orbit-and-attitude coupling; and
   step 2, analyzing, according to a control variate method, to derive a law of influence of parameters such as a cone angle and a strut length in the pyramid deorbit sail on attitude stability and deorbiting efficiency of a spacecraft in different cases based on the pyramid deorbit sail system-oriented dynamics model featuring three-dimensional orbit-and-attitude coupling considering airflow obstruction obtained in step 1, and optimizing configuration parameters of the pyramid deorbit sail system based on the law to obtain a pyramid deorbit sail configuration achieving high attitude stability and high deorbiting efficiency and hence improved attitude stability and deorbiting efficiency of the spacecraft.

2. The configuration construction method for a pyramid deorbit sail according to claim 1, wherein step 1 is implemented as follows:
   during dynamics modeling of the pyramid deorbit sail system, the deorbit sail is taken as a rigid body, mass of struts is allocated to the thin-filmed sail surface as an equivalent form of surface density, and a spacecraft body is taken as a mass point; a pyramid deorbit sail device is installed at an o-point on the spacecraft body, and comprises a plurality of struts and a plurality of thin-filmed sail surfaces, wherein the struts are deployed and extended in an inclination direction, every two adjacent struts are connected to the triangular thin-filmed sail surface, the struts of the pyramid deorbit sail are of equal length, an included angle between each of the struts and a symmetry axis of the deorbit sail is the same, and a distance between tops of any two adjacent struts is the same; and a body coordinate system $Ox_b y_b z_b$ is established with the o-point as an origin, wherein a $y_b$ axis coincides with the symmetry axis of the deorbit sail and points to the spacecraft body from the deorbit sail, which is in line with the right-hand rule;
   regarding a spacecraft in low earth orbit, given that environmental perturbation like atmospheric resistance perturbation and non-spherical earth perturbation are important influence factors on orbital motion of the spacecraft, a rate of change of orbital state vectors such as a geocentric distance r and a velocity v is defined in formula (1-1); for the purpose of avoiding singularity, a spacecraft attitude is described using a quaternion algorithm, as expressed in formula (1-2) and formula (1-3); torque T imparted on the spacecraft is a vector sum of control torque and environmental torque, in which the environmental torque takes into account aerodynamic torque and gravity gradient torque; formula (1) gives a pyramid deorbit sail system-oriented dynamics model featuring three-dimensional orbit-and-attitude coupling established based on position vectors and quaternion descriptions, and the spacecraft is equipped with a pyramid deorbit sail; and formula (1) consists of formula (1-1), formula (1-2) and formula (1-3):

$$\begin{bmatrix} \dot{r} \\ \ddot{r} \end{bmatrix} = \begin{bmatrix} v \\ \ddot{r}_A + \ddot{r}_U \end{bmatrix} \tag{1-1}$$

$$T = I\dot{\omega}_b + \omega_b \times I\omega_b \tag{1-2}$$

$$\begin{cases} \dot{q} = \frac{1}{2}(q_0 \omega_b + q \times \omega_b) \\ \dot{q}_0 = -\frac{1}{2} q^T \omega_b \end{cases} \tag{1-3}$$

wherein $\ddot{r}_A$ and $\ddot{r}_U$ respectively denote a perturbation acceleration induced under atmospheric resistance and a perturbation acceleration induced under gravitational force, I denotes a rotational inertia of a spacecraft, $\omega_b$ denotes an angular velocity of the spacecraft, and $Q=[q\ q_0]^T$ denotes a quaternion;
the struts and the thin-filmed sail surfaces of the pyramid deorbit sail both have a quantity of n(n≥3), and the perturbation induced under atmospheric resistance on an i(i=1, 2, . . . , n)$_{th}$ thin-filmed sail surface is expressed as follows:

$$F_{A,i} = -\tfrac{1}{2} c_d \rho A_{exp}(n_{li} \cdot v) v \tag{2}$$

wherein $c_d$ denotes an atmospheric resistance coefficient, $\rho$ denotes an atmospheric density, $A_{exp}$ denotes an area of a sail surface exposed to airflow, v denotes a velocity of a spacecraft relative to the atmosphere, $n_{li}$ denotes an exterior normal unit vector of the sail surface in an inertial coordinate system, and m denotes mass of the spacecraft;

a perturbation acceleration of the spacecraft induced as a whole under atmospheric resistance is expressed as follows:

$$\ddot{r}_A = \frac{1}{m} \sum_{i=1}^{n} F_{A,i} \tag{3}$$

in a low earth orbit, oblateness of earth is taken as a main influence factor on the non-spherical earth perturbation; given that in a gravitational potential function, tesseral harmonics only affect short-period motion of the spacecraft, the tesseral harmonics are thus ignorable, only zonal harmonics $J_2$ need to be considered, and a perturbation acceleration induced under gravitational force is expressed as follows:

$$\ddot{r}_U = -\frac{\mu}{r^3} r - \frac{3}{2} J_2 \frac{\mu R_e^2}{r^5} r \tag{4}$$

wherein $J_2$ denotes a zonal harmonic coefficient, $\mu$ denotes a gravitational constant, and $R_e$ denotes an earth radius;

aerodynamic torque acting on the spacecraft is yielded under noncoincidence in a center of pressure and a center of mass of the spacecraft, which is expressed as follows:

$$T_A = \sum_{i=1}^{n} (r_{CM,i} - r_{CM}) \times F_{Ab,i} \tag{5}$$

wherein $r_{CM,i}$ denotes a position vector for a center of mass of each thin-filmed sail surface in a body coordinate system; and $r_{CM}$ denotes a position vector for a center of pressure of the deorbit sail in the body coordinate system; and $F_{Ab,i}$ denotes atmospheric resistance exerted on each thin-filmed sail surface in the body coordinate system;

the center of mass of each triangular thin-filmed sail surface is also a geometric gravity center of the triangle, namely an average position of three vertices, for example, the center of mass of the sail surface OAB in the body coordinate system is expressed as follows:

$$r_{CM,OAB} = \tfrac{1}{3}(r_O + r_A + r_B) \tag{6}$$

wherein $r_{(\ )}$ denotes a position vector of point ( ) in the body coordinate system;

the center of pressure of the spacecraft is dependent merely on the thin-filmed sail surface, the thin-filmed sail is made of a homogeneous material with a surface density of $\sigma_m$, and the mass of a strut per unit length is denoted as $\rho_b$; and in order to simplify the amount of calculation, the mass of the strut is allocated to the thin-filmed sail surface as an equivalent form of surface density of the deorbit sail, which is expressed as follows:

$$\sigma = \frac{nA\sigma_m + nl\rho_b}{nA} \tag{7}$$

wherein a geometric area of the thin-filmed sail surface is expressed as $$A = \frac{b}{4}\sqrt{4l^2 - b^2},$$

$$b = 2\sin\frac{\pi}{n} l \sin\theta,$$

l denotes a strut length of the deorbit sail, b denotes a distance between tops of two struts, and $\theta$ denotes an included angle between the strut and a $y_b$ axis, which is also known as a cone angle of the deorbit sail, and is within a range of (0°,90°);

when the spacecraft body is simplified to a mass point with mass $m_s$, and located at an origin of the body coordinate system, total mass of the spacecraft is expressed as follows:

$$m = nA\sigma + m_s \tag{8}$$

a position of the center of mass of the spacecraft in the body coordinate system is expressed as follows:

$$r_{CM} = \frac{\sum_{i=1}^{n} r_{CM,i} \cdot \sigma A}{m} \tag{9}$$

besides, gravity gradient torque is also imparted on the spacecraft, and is expressed as follows:

$$T_U = \frac{3\mu}{r_b^3} \left( \frac{-r_b}{r_b} \times I \frac{-r_b}{r_b} \right) \tag{10}$$

wherein $r_b$ denotes a position vector of the spacecraft in the body coordinate system;

given the symmetry, a principal inertia axis of the spacecraft is aligned with a body coordinate axis; and then a random junior unit R on the sail surface is taken, and a position thereof is described with (s, t), wherein s is along an edge of the sail surface, and t is parallel to a base of the sail surface;

coordinates of the random junior unit R on the sail surface in the body coordinate system are as follows: and $$r_R = \begin{bmatrix} \sin\theta \\ -\cos\theta \\ 0 \end{bmatrix} s + \begin{bmatrix} -\sin\theta \\ 0 \\ \sin\theta \end{bmatrix} \frac{l}{b} t \tag{11}$$

based on the foregoing coordinates, a distance from the random junior unit R on the sail surface to each of the three principal inertia axes is expressed as follows:

$$d_x^2 = r_{R,z}^2 + (r_{R,y} - r_{CM,y})^2$$

$$d_y^2 = r_{R,z}^2 + r_{R,x}^2$$

$$d_z^2 = r_{R,x}^2 + (r_{R,y} - r_{CM,y})^2 \tag{12}$$

the obtained distances are substituted to an expression for rotational inertia of the sail surface to obtain rotational inertia of the thin-filmed sail surface i as follows:

$$I_i = \int_A \sigma d^2 dA = \int_0^l \int_0^{\frac{b_s}{l}s} \sigma d^2 \sqrt{1-b^2/(4l^2)}\, dt\, ds \quad (13)$$

given symmetry, every triangular sail surface's moment of inertia relative to the spacecraft's inertial principal axis is calculated in the same way, from which principal rotational inertia of the spacecraft is derived as follows:

$$I_x = nI_{i,x} + m_s r_{CM,y}^2 + I_{s,x}$$

$$I_y = nI_{i,y} + I_{s,y}$$

$$I_z = nI_{i,z} + m_s r_{CM,y}^2 + I_{s,z} \quad (14)$$

wherein $I_s$ denotes rotational inertia of the spacecraft body;

when airflow is obstructed by a sail surface lying in the front among the thin-filmed sail surfaces of the pyramid deorbit sail, the influence of atmospheric resistance on the sail surface in the back is ignorable, and merely the area of the sail surfaces exposed to the airflow needs to be considered when calculating the atmospheric resistance perturbation; by combining factors such as the influence of the windward area of the sail surface in the case of airflow obstruction on the atmospheric resistance exerted on the pyramid deorbit sail, and the further influence of the windward area of the sail surface in the case of airflow obstruction on the orbit and attitude of the pyramid deorbit sail, the precision of the pyramid deorbit sail system-oriented dynamics model featuring three-dimensional orbit-and-attitude coupling is improved;

in case of a small initial orbit inclination, the spacecraft makes attitude motion mainly in an orbital plane, and therefore, airflow obstruction occurs only in the orbital plane; a direction of the spacecraft relative to the airflow is indicated with an angle of direction, wherein the angle of direction α is an included angle between a $y_b$ axis and a velocity v and is within a range of $[-\pi, \pi]$; when $$\alpha \in \left(-\pi+\theta, -\frac{\pi}{2}\right) \cup \left(\frac{\pi}{2}, \pi-\theta\right),$$

the sail surface is likely to be obstructed in part; and according to the symmetry and a geometric relationship in the deorbit sail, an airflow exposure area $A_{exp}$ is obtained as n varies in value, wherein when n→∞, the deorbit sail is approximated to a pyramid deorbit sail, which is expressed as follows;

$$A_{exp,n=3} = 3A - \left[\frac{\sin(|\alpha|+\theta)}{\sin(|\alpha|-\theta)}\right]A \quad (15)$$

$$A_{exp,n=4} = 4A - \left[\frac{2\sin(|\alpha|+\theta)}{\sin(|\alpha|-\theta)}\right]A$$

$$A_{exp,n=5} = 4A - \frac{\sin(|\alpha|+\theta)}{\sin(|\alpha|-\theta)}A - \frac{l^2}{2}\sin(2\varphi)\frac{\sin(|\alpha|+\theta)}{\sin(|\alpha|-\theta)}\frac{\sin(|\alpha|+\varphi)}{\sin(|\alpha|-\varphi)}$$

$$A_{exp,n=6} = 6A - \left[\frac{2\sin(|\alpha|+\theta)}{\sin(|\alpha|-\theta)} + \frac{\sin^2(|\alpha|+\theta)}{\sin^2(|\alpha|+\theta)}\right]A$$

$$\vdots$$

$$A_{exp,n\to\infty} = \int_0^l \int_{\kappa_\alpha}^\pi s\, d\kappa\, ds + \int_{\lambda l}^l \int_0^{\kappa_\alpha} s\, d\kappa\, ds$$

wherein $$\varphi = \arcsin\frac{b}{2l},$$

$\kappa_\alpha = \arccos(\tan\theta \cot\theta)$, κ denotes a circumferential angle of the pyramid deorbit sail, and λ denotes a radial limit of airflow impact on the deorbit sail;

with the environmental perturbation like atmospheric resistance perturbation and non-spherical earth perturbation taken into consideration, the pyramid deorbit sail system-oriented dynamics model featuring three-dimensional orbit-and-attitude coupling is established based on the position vectors and quaternion descriptions, wherein the pyramid deorbit sail system-oriented dynamics model featuring three-dimensional orbit-and-attitude coupling is shown in formula (1); and by considering, according to formula (15), the factors such as the influence of the windward area of the sail surface in the case of airflow obstruction on atmospheric resistance exerted on the pyramid deorbit sail and the further influence of the windward area of the sail surface in the case of airflow obstruction on the orbit and attitude of the pyramid deorbit sail in the model establishing process the precision of the pyramid deorbit sail system-oriented dynamics model featuring three-dimensional orbit-and-attitude coupling is improved.

3. The configuration construction method for a pyramid deorbit sail according to claim 2, wherein in step 2, said analyzing to derive a law of influence of a cone angle and a strut length in the pyramid deorbit sail on the attitude stability and deorbiting efficiency of the spacecraft by considering the influence of parameters in the deorbit sail on attitude stability and deorbiting efficiency of a spacecraft in different cases specifically comprises:

in case I of a same initial orbit altitude of the spacecraft, and a same maximum area-mass ratio but different cone angles for the pyramid deorbit sail, selecting configuration parameters of the pyramid deorbit sail system yielding a minimum difference in rotational inertia components of the spacecraft to realize optimal configuration construction for the pyramid deorbit sail;

in case II of a same initial orbit altitude of the spacecraft, and a same maximum area-mass ratio but different cone angles for the pyramid deorbit sail, given that the attitude stability and the deorbiting efficiency of the spacecraft first increase and then decrease along with the increase of the cone angle of the deorbit sail, balancing the attitude stability and the maximum area-mass ratio of the spacecraft to obtain the optimal cone angle of the deorbit sail and thus realize the optimal configuration construction for the pyramid deorbit sail;

in case III of a same initial orbit altitude of the spacecraft, and a same cone angle as well as a same strut length for the pyramid deorbit sail, given that the strut length has little impact on the attitude stability, focusing mainly on the design of the cone angle, selecting a cone angle of the pyramid deorbit sail yielding a minimum difference in rotational inertia components of the spacecraft to realize optimal configuration construction for the pyramid deorbit sail; and in case IV of different initial orbit altitudes of the spacecraft and a same cone angle as well as a same strut length for the pyramid deorbit sail, given that the larger the orbit altitude of the spacecraft is, the lower the spacecraft stability becomes, selecting a deorbit sail with a large cone angle to reduce the influence of orbit altitudes on attitude stability and thus realize the optimal configuration construction for the pyramid deorbit sail.

4. An attitude control method for a pyramid deorbit sail implemented based on the configuration construction method for a pyramid deorbit sail according to claim 1, comprising step 1 and step 2 of the configuration construction method for a pyramid deorbit sail, wherein the attitude control method further comprises step 3:

based on the configuration parameters of the pyramid deorbit sail achieving high attitude stability and high deorbiting efficiency obtained in step 2, designing a quaternion feedback-based repositioning control law for the pyramid deorbit sail, considering transfer of a velocity coordinate system with respect to the body coordinate system in the quaternion feedback-based repositioning control law to develop a quaternion feedback-based repositioning Proportional-Integral-Derivative Control (PID) control law for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

5. The attitude control method for a pyramid deorbit sail according to claim 4, wherein step 1 is implemented as follows:

during dynamics modeling of the pyramid deorbit sail system, the deorbit sail is taken as a rigid body, mass of struts is allocated to the thin-filmed sail surface as an equivalent form of surface density, and a spacecraft body is taken as a mass point; a pyramid deorbit sail device is installed at an o-point on the spacecraft body, and comprises a plurality of struts and a plurality of thin-filmed sail surfaces, wherein the struts are deployed and extended in an inclination direction, every two adjacent struts are connected to the triangular thin-filmed sail surface, the struts of the pyramid deorbit sail are of equal length, an included angle between each of the struts and a symmetry axis of the deorbit sail is the same, and a distance between tops of any two adjacent struts is the same; and a body coordinate system $Ox_b y_b z_b$ is established with the o-point as an origin, wherein a $y_b$ axis coincides with the symmetry axis of the deorbit sail and points to the spacecraft body from the deorbit sail, which is in line with the right-hand rule;

regarding a spacecraft in low earth orbit, given that environmental perturbation like atmospheric resistance perturbation and non-spherical earth perturbation are important influence factors on orbital motion of the spacecraft, a rate of change of orbital state vectors such as a geocentric distance r and a velocity v is defined in formula (1-1); for the purpose of avoiding singularity, a spacecraft attitude is described using a quaternion algorithm, as expressed in formula (1-2) and formula (1-3); torque T imparted on the spacecraft is a vector sum of control torque and environmental torque, in which the environmental torque takes into account aerodynamic torque and gravity gradient torque; formula (1) gives a pyramid deorbit sail system-oriented dynamics model featuring three-dimensional orbit-and-attitude coupling established based on position vectors and quaternion descriptions, and the spacecraft is equipped with a pyramid deorbit sail; and formula (1) consists of formula (1-1), formula (1-2) and formula (1-3);

$$\begin{bmatrix} \dot{r} \\ \ddot{r} \end{bmatrix} = \begin{bmatrix} v \\ \ddot{r}_A + \ddot{r}_U \end{bmatrix} \quad (1\text{-}1)$$

$$T = I\dot{\omega}_b + \omega_b \times I\omega_b \quad (1\text{-}2)$$

$$\begin{cases} \dot{q} = \frac{1}{2}(q_0 \omega_b + q \times \omega_b) \\ \dot{q}_0 = -\frac{1}{2} q^T \omega_b \end{cases} \quad (1\text{-}3)$$

wherein $\ddot{r}_A$ and $\ddot{r}_U$ respectively denote a perturbation acceleration induced under atmospheric resistance and a perturbation acceleration induced under gravitational force, I denotes a rotational inertia of a spacecraft, $\omega_b$ denotes an angular velocity of the spacecraft, and $Q=[q\ q_0]^T$ denotes a quaternion;

the struts and the thin-filmed sail surfaces of the pyramid deorbit sail both have a quantity of n(n≥3), and the perturbation induced under atmospheric resistance on an i(i=1, 2, . . . , n)$_{th}$ thin-filmed sail surface is expressed as follows:

$$F_{A,i} = -\frac{1}{2} c_d \rho A_{exp}(n_{li} \cdot v) v \quad (2)$$

wherein $c_d$ denotes an atmospheric resistance coefficient, $\rho$ denotes an atmospheric density, $A_{exp}$ denotes an area of a sail surface exposed to airflow, v denotes a velocity of a spacecraft relative to the atmosphere, $n_{li}$ denotes an exterior normal unit vector of the sail surface in an inertial coordinate system, and m denotes mass of the spacecraft;

a perturbation acceleration of the spacecraft induced as a whole under atmospheric resistance is expressed as follows:

$$\ddot{r}_A = \frac{1}{m} \sum_{i=1}^{n} F_{A,i} \quad (3)$$

in a low earth orbit, oblateness of earth is taken as a main influence factor on the non-spherical earth perturbation; given that in a gravitational potential function, tesseral harmonics only affect short-period motion of the spacecraft, the tesseral harmonics are thus ignorable, only zonal harmonics $J_2$ need to be considered, and a perturbation acceleration induced under gravitational force is expressed as follows:

$$\ddot{r}_U = -\frac{\mu}{r^3} r - \frac{3}{2} J_2 \frac{\mu R_e^2}{r^5} r \quad (4)$$

wherein $J_2$ denotes a zonal harmonic coefficient, $\mu$ denotes a gravitational constant, and $R_e$ denotes an earth radius;

aerodynamic torque acting on the spacecraft is yielded under noncoincidence in a center of pressure and a center of mass of the spacecraft, which is expressed as follows:

$$T_A = \sum_{i=1}^{n}(r_{CM,i} - r_{CM}) \times F_{Ab,i} \qquad (5)$$

wherein $r_{CM,i}$ denotes a position vector for a center of mass of each thin-filmed sail surface in a body coordinate system; and $r_{CM}$ denotes a position vector for a center of pressure of the deorbit sail in the body coordinate system; and $F_{Ab,i}$ denotes atmospheric resistance exerted on each thin-filmed sail surface in the body coordinate system;

the center of mass of each triangular thin-filmed sail surface is also a geometric gravity center of the triangle, namely an average position of three vertices, for example, the center of mass of the sail surface OAB in the body coordinate system is expressed as follows:

$$r_{CM,OAB} = \tfrac{1}{3}(r_O + r_A + r_B) \qquad (6)$$

wherein $r_{(\ )}$ denotes a position vector of point ( ) in the body coordinate system;

the center of pressure of the spacecraft is dependent merely on the thin-filmed sail surface, the thin-filmed sail is made of a homogeneous material with a surface density of $\sigma_m$, and the mass of a strut per unit length is denoted as $\rho_b$; and in order to simplify the amount of calculation, the mass of the strut is allocated to the thin-filmed sail surface as an equivalent form of surface density of the deorbit sail, which is expressed as follows:

$$\sigma = \frac{nA\sigma_m + nl\rho_b}{nA} \qquad (7)$$

wherein a geometric area of the thin-filmed sail surface is expressed as $$A = \frac{b}{4}\sqrt{4l^2 - b^2}, \, b = 2\sin\frac{\pi}{n}l\sin\theta, \qquad (45)$$

l denotes a strut length of the deorbit sail, b denotes a distance between tops of two struts, and θ denotes an included angle between the strut and a $y_b$ axis, which is also known as a cone angle of the deorbit sail, and is within a range of (0°,90°);

when the spacecraft body is simplified to a mass point with mass $m_s$, and located at an origin of the body coordinate system, total mass of the spacecraft is expressed as follows:

$$m = nA\sigma + m_s \qquad (8)$$

a position of the center of mass of the spacecraft in the body coordinate system is expressed as follows:

$$r_{CM} = \frac{\sum_{i=1}^{n} r_{CM,i}\sigma A}{m} \qquad (9)$$

besides, gravity gradient torque is also imparted on the spacecraft, and is expressed as follows:

$$T_U = \frac{3\mu}{r_b^3}\left(\frac{-r_b}{r_b} \times I\frac{-r_b}{r_b}\right) \qquad (10)$$

wherein $r_b$ denotes a position vector of the spacecraft in the body coordinate system;

given the symmetry, a principal inertia axis of the spacecraft is aligned with a body coordinate axis; and then a random junior unit Ron the sail surface is taken, and a position thereof is described with (s, t), wherein s is along an edge of the sail surface, and t is parallel to a base of the sail surface;

coordinates of the random junior unit R on the sail surface in the body coordinate system are as follows: and $$r_R = \begin{bmatrix} \sin\theta \\ -\cos\theta \\ 0 \end{bmatrix} s + \begin{bmatrix} -\sin\theta \\ 0 \\ \sin\theta \end{bmatrix}\frac{l}{b}t \qquad (11)$$

based on the foregoing coordinates, a distance from the random junior unit R on the sail surface to each of the three principal inertia axes is expressed as follows:

$$d_x^2 = r_{R,z}^2 + (r_{R,y} - r_{CM,y})^2$$

$$d_y^2 = r_{R,z}^2 + r_{R,x}^2$$

$$d_z^2 = r_{R,x}^2 + (r_{R,y} - r_{CM,y})^2 \qquad (12)$$

the obtained distances are substituted to an expression for rotational inertia of the sail surface to obtain rotational inertia of the thin-filmed sail surface i as follows:

$$I_i = \int_A \sigma d^2 dA = \int_0^l \int_0^{\frac{b}{l}s} \sigma d^2 \sqrt{1 - b^2/(4l^2)}\, dtds \qquad (13)$$

given symmetry, every triangular sail surface's moment of inertia relative to the spacecraft's inertial principal axis is calculated in the same way, from which principal rotational inertia of the spacecraft is derived as follows:

$$I_x = nI_{i,x} + m_s r_{CM,y}^2 + I_{s,x}$$

$$I_y = nI_{i,y} + I_{s,y}$$

$$I_z = nI_{i,z} + m_s r_{CM,y}^2 + I_{s,z} \qquad (14)$$

wherein $I_s$ denotes rotational inertia of the spacecraft body;

when airflow is obstructed by a sail surface lying in the front among the thin-filmed sail surfaces of the pyramid deorbit sail, the influence of atmospheric resistance on the sail surface in the back is ignorable, and merely the area of the sail surfaces exposed to the airflow needs to be considered when calculating the atmospheric resistance perturbation; by combining factors such as the influence of the windward area of the sail surface in the case of airflow obstruction on the atmospheric resistance exerted on the pyramid deorbit sail, and the further influence of the windward area of the sail surface in the case of airflow obstruction on the orbit and attitude of the pyramid deorbit sail, the precision of the pyramid deorbit sail system-oriented dynamics model featuring three-dimensional orbit-and-attitude coupling is improved;

in case of a small initial orbit inclination, the spacecraft makes attitude motion mainly in an orbital plane, and therefore, airflow obstruction occurs only in the orbital plane; a direction of the spacecraft relative to the airflow is indicated with an angle of direction, wherein the angle of direction α is an included angle between a $y_b$ axis and a velocity v, and is within a range of $[-\pi, \pi]$; when $$\alpha \in \left(-\pi+\theta, -\frac{\pi}{2}\right) \cup \left(\frac{\pi}{2}, \pi-\theta\right), \quad (15)$$

the sail surface is likely to be obstructed in part; and according to the symmetry and a geometric relationship in the deorbit sail, an airflow exposure area $A_{exp}$ is obtained as n varies in value, wherein when n→∞, the deorbit sail is approximated to a pyramid deorbit sail, which is expressed as follows;

$$A_{exp,n=3} = 3A - \left[\frac{\sin(|\alpha|+\theta)}{\sin(|\alpha|-\theta)}\right]A$$

$$A_{exp,n=4} = 4A - \left[\frac{2\sin(|\alpha|+\theta)}{\sin(|\alpha|-\theta)}\right]A$$

$$A_{exp,n=5} = 4A - \frac{\sin(|\alpha|+\theta)}{\sin(|\alpha|-\theta)}A - \frac{l^2}{2}\sin(2\varphi)\frac{\sin(|\alpha|+\theta)}{\sin(|\alpha|-\theta)}\frac{\sin(|\alpha|+\varphi)}{\sin(|\alpha|-\varphi)}$$

$$A_{exp,n=6} = 6A\left[\frac{2\sin(|\alpha|+\theta)}{\sin(|\alpha|-\theta)} + \frac{\sin^2(|\alpha|+\theta)}{\sin^2(|\alpha|-\theta)}\right]A$$

$$\vdots$$

$$A_{exp,n\to\infty} = \int_0^l \int_{\kappa_a}^\pi s d\kappa ds + \int_{\lambda l}^l \int_0^{\kappa_\alpha} s d\kappa ds$$

wherein $$\varphi = \arcsin\frac{b}{2l},$$

$\kappa_\alpha = \arccos(\tan\theta \cot\theta)$, κ denotes a circumferential angle of the pyramid deorbit sail, and λ denotes a radial limit of airflow impact on the deorbit sail;

with the environmental perturbation like atmospheric resistance perturbation and non-spherical earth perturbation taken into consideration, the pyramid deorbit sail system-oriented dynamics model featuring three-dimensional orbit-and-attitude coupling is established based on the position vectors and quaternion descriptions, wherein the pyramid deorbit sail system-oriented dynamics model featuring three-dimensional orbit-and-attitude coupling is shown in formula (1); and by considering, according to formula (15), the factors such as the influence of the windward area of the sail surface in the case of airflow obstruction on atmospheric resistance exerted on the pyramid deorbit sail and the further influence of the windward area of the sail surface in the case of airflow obstruction on the orbit and attitude of the pyramid deorbit sail in the model establishing process the precision of the pyramid deorbit sail system-oriented dynamics model featuring three-dimensional orbit-and-attitude coupling is improved.

6. The attitude control method for a pyramid deorbit sail according to claim 5, wherein in step 2, said analyzing to derive a law of influence of a cone angle and a strut length in the pyramid deorbit sail on the attitude stability and deorbiting efficiency of the spacecraft by considering the influence of parameters in the deorbit sail on attitude stability and deorbiting efficiency of a spacecraft in different cases specifically comprises:

in case I of a same initial orbit altitude of the spacecraft, and a same maximum area-mass ratio but different cone angles for the pyramid deorbit sail, selecting configuration parameters of the pyramid deorbit sail system yielding a minimum difference in rotational inertia components of the spacecraft to realize optimal configuration construction for the pyramid deorbit sail;

in case II of a same initial orbit altitude of the spacecraft, and a same maximum area-mass ratio but different cone angles for the pyramid deorbit sail, given that the attitude stability and the deorbiting efficiency of the spacecraft first increase and then decrease along with the increase of the cone angle of the deorbit sail, balancing the attitude stability and the maximum area-mass ratio of the spacecraft to obtain the optimal cone angle of the deorbit sail and thus realize the optimal configuration construction for the pyramid deorbit sail;

in case III of a same initial orbit altitude of the spacecraft, and a same cone angle as well as a same strut length for the pyramid deorbit sail, given that the strut length has little impact on the attitude stability, focusing mainly on the design of the cone angle, selecting a cone angle of the pyramid deorbit sail yielding a minimum difference in rotational inertia components of the spacecraft to realize optimal configuration construction for the pyramid deorbit sail; and in case IV of different initial orbit altitudes of the spacecraft and a same cone angle as well as a same strut length for the pyramid deorbit sail, given that the larger the orbit altitude of the spacecraft is, the lower the spacecraft stability becomes, selecting a deorbit sail with a large cone angle to reduce the influence of orbit altitudes on attitude stability and thus realize the optimal configuration construction for the pyramid deorbit sail.

7. The attitude control method for a pyramid deorbit sail according to claim 4, wherein step 3 is implemented as follows:

in the quaternion feedback-based repositioning control law, a linear state feedback controller is used for achieving attitude maneuver of the spacecraft, and a gyroscopic term about moment of inertia is directly offset by the control torque, wherein the control law is expressed as follows:

$$u = -Kq_e - C\omega_b + \omega_b \times I\omega_b \quad (16)$$

wherein $q_e = [q_{1e}\ q_{2e}\ q_{3e}]^T$ denotes a vector of an attitude error quaternion, and K and C each denote a controller gain matrix; an attitude error quaternion $[q_{1e}\ q_{2e}\ q_{3e}\ q_{0e}]^T$ is calculated from a command attitude quaternion $[q_{1c}\ q_{2c}\ q_{3c}\ q_{0c}]^T$ and a current attitude quaternion $[q_1\ q_2\ q_3\ q_0]^T$, according to the following formula:

$$\begin{cases} q_e = q_{0c}q - q_0 q_c + q \times q_c \\ q_{0e} = q_{0c}q_0 + q_c^T q \end{cases} \quad (17)$$

if a matrix $K^{-1}C$ is positive definite, an origin of a closed-loop system with a controller is globally asymptotically stable; and therefore, K=kI and C=cI are chosen, the algorithm uses scaling of rotational inertia and a derivative gain matrix to reduce overshoot of the controller and make the system globally asymptotically stable;

at this time, a proportional differential control law is expressed as follow:

$$u = -kIq_e - cI\omega_b + \omega_b \times I\omega_b \tag{18}$$

wherein a gain coefficient k and a damping coefficient c are functions of a systematic intrinsic frequency and a damping ratio required, and are defined as follows:

$$k = 2\omega_n^2, \quad c = 2\omega_n \xi$$

wherein $\omega_n$ denotes a systematic intrinsic frequency, and $\xi$ denotes a damping ratio;

a reaction wheel is selected as an actuator, when a rotational speed of the reaction wheel reaches a certain extreme state, the reaction wheel stops absorbing excess moment of momentum from the spacecraft and is in a saturated mode, at this moment, the spacecraft is left out of control, and restrictions are supposed to be imposed on actual torque and angular momentum of a control system, wherein the angular momentum of the reaction wheel is calculated from an equation of state of the reaction wheel as follows:

$$\dot{H}_{RW} = -u - \omega_b \times H_{RW} \tag{19}$$

wherein $H_{RW}$ denotes angular momentum of the reaction wheel;

in this case, both the spacecraft and a flywheel ought to be considered in an attitude dynamics model;

$$T = I\dot{\omega}_b + \dot{H}_{RW} + \omega_b \times (I\omega_b + H_{RW}) \tag{20}$$

in order to maneuver the attitude of the pyramid deorbit sail system from any angle to a direction corresponding to the maximum windward area and maintain stability, it is necessary to set the command attitude quaternion in the attitude controller to an attitude quaternion corresponding to an angle of direction of 0°;

in order to accurately describe a size and a direction of the angle of direction, a velocity coordinate system $x_o y_o z_o$ is established, with an origin of the coordinate system being a center of mass of the spacecraft; a $y_o$ axis coincides with the velocity direction of the spacecraft, an $x_o$ axis is perpendicular to the $y_o$ axis in the orbital plane, and a direction at which the center of the earth points to the origin of the coordinate system is taken as a positive direction; a $z_o$ axis conforms to the right-hand rule; the angle of direction being kept at 0° is indicative of coincidence between the spacecraft body coordinate system and the velocity coordinate system;

a quaternion feedback-based repositioning control method is adopted, and attitude parameters of the spacecraft body coordinate system with respect to the velocity coordinate system are described using quaternions, which is expressed as follows:

$$\begin{cases} \dot{q} = \frac{1}{2}(q_0 \omega_{bo} + q \times \omega_{bo}) \\ \dot{q}_0 = -\frac{1}{2} q^T \omega_{bo} \end{cases} \tag{21}$$

wherein $\omega_{bo}$ denotes an angular velocity vector of the body coordinate system relative to the velocity coordinate system, and satisfies a relational expression $\omega_{bo} = \omega_b - C_{x_b x_o} \omega_o$; and $\omega_o$ denotes a projection of an orbital angular velocity of the spacecraft in the velocity coordinate system, which is calculated according to the following formula:

$$\omega_o = \frac{|v|}{|r|} \cdot \begin{bmatrix} 0 \\ 0 \\ 1 \end{bmatrix} \tag{22}$$

$C_{x_b x_o}$ denotes a transformation matrix from the body coordinate system to the velocity coordinate system, which is expressed as follows:

$$C_{x_b x_o} = \begin{bmatrix} q_0^2 + q_1^2 - q_2^2 - q_3^2 & 2(q_1 q_2 + q_0 q_3) & 2(q_1 q_3 - q_0 q_2) \\ 2(q_1 q_3 + q_0 q_3) & q_0^2 - q_1^2 + q_2^2 - q_3^2 & 2(q_0 q_1 + q_2 q_3) \\ 2(q_1 q_2 - q_0 q_2) & 2(q_2 q_3 - q_0 q_1) & q_0^2 - q_1^2 - q_2^2 + q_3^2 \end{bmatrix} \tag{23}$$

given that the transformation matrix $C_{x_o X}$ from the velocity coordinate system to the inertial coordinate system is merely associated with orbit information, which is expressed as follows:

$$C_{x_o X} = \begin{bmatrix} \dfrac{v}{|v|} \times \dfrac{r \times v}{|r \times v|} & \dfrac{v}{|v|} & \dfrac{r \times v}{|r \times v|} \end{bmatrix}^T \tag{24}$$

a transformation matrix $C_{x_b X} = C_{x_b x_o} C_{x_o X}$ from the body coordinate system to the inertial coordinate system is as follows:

in order to make the spacecraft body coordinate system coincide with the velocity coordinate system, the command attitude quaternion is set to $[0\ 0\ 0\ 1]^T$, and the quaternions of the current body coordinate system and velocity coordinate system are controlled using the quaternion feedback-based repositioning control law;

however, given the distinction of $\omega_b$ and $\omega_{bo}$ in the control law, it is necessary to offset a static difference using an integral term, that is, a complete PID controller is required as follows;

$$u = -kIq_e - cI\omega_b - k_i \int q_e + \omega_b \times I\omega_b \tag{25}$$

wherein $k_i$ denotes an integral term-related parameter;

based on the configuration parameters of the pyramid deorbit sail achieving high attitude stability and high deorbiting efficiency obtained in step 2, and the pyramid deorbit sail system-oriented dynamics model featuring three-dimensional orbit-and-attitude coupling considering airflow obstruction established in step 1, transfer of the velocity coordinate system with respect to the body coordinate system is considered in the quaternion feedback-based repositioning control law to develop the quaternion feedback-based repositioning PID control law as shown in formula (25) for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

8. The attitude control method for a pyramid deorbit sail according to claim 5, wherein step 3 is implemented as follows:

in the quaternion feedback-based repositioning control law, a linear state feedback controller is used for achieving attitude maneuver of the spacecraft, and a gyroscopic term about moment of inertia is directly offset by the control torque, wherein the control law is expressed as follows:

$$u = -Kq_e - C\omega_b + \omega_b \times I\omega_b \quad (16)$$

wherein $q_e = [q_{1e}\ q_{2e}\ q_{3e}]^T$ denotes a vector of an attitude error quaternion, and K and C each denote a controller gain matrix; an attitude error quaternion $[q_{1e}\ q_{2e}\ q_{3e}\ q_{0e}]^T$ is calculated from a command attitude quaternion $[q_{1c}\ q_{2c}\ q_{3c}\ q_{0c}]^T$ and a current attitude quaternion $[q_1\ q_2\ q_3\ q_0]^T$, according to the following formula:

$$\begin{cases} q_e = q_{0c}q - q_0 q_c + q \times q_c \\ q_{0e} = q_{0c}q_0 + q_c^T q \end{cases} \quad (17)$$

if a matrix $K^{-1}C$ is positive definite, an origin of a closed-loop system with a controller is globally asymptotically stable; and therefore, K=kI and C=cI are chosen, the algorithm uses scaling of rotational inertia and a derivative gain matrix to reduce overshoot of the controller and make the system globally asymptotically stable;

at this time, a proportional differential control law is expressed as follow:

$$u = -kIq_e - cI\omega_b + \omega_b \times I\omega_b \quad (18)$$

wherein a gain coefficient k and a damping coefficient c are functions of a systematic intrinsic frequency and a damping ratio required, and are defined as follows:

$$k = 2\omega_n^2,\ c = 2\omega_n \xi$$

wherein $\omega_n$ denotes a systematic intrinsic frequency, and $\xi$ denotes a damping ratio;

a reaction wheel is selected as an actuator, when a rotational speed of the reaction wheel reaches a certain extreme state, the reaction wheel stops absorbing excess moment of momentum from the spacecraft and is in a saturated mode, at this moment, the spacecraft is left out of control, and restrictions are supposed to be imposed on actual torque and angular momentum of a control system, wherein the angular momentum of the reaction wheel is calculated from an equation of state of the reaction wheel as follows:

$$\dot{H}_{RW} = -u - \omega_b \times H_{RW} \quad (19)$$

wherein $H_{RW}$ denotes angular momentum of the reaction wheel;

in this case, both the spacecraft and a flywheel ought to be considered in an attitude dynamics model;

$$T = I\dot{\omega}_b + \dot{H}_{RW} + \omega_b \times (I\omega_b + H_{RW}) \quad (20)$$

in order to maneuver the attitude of the pyramid deorbit sail system from any angle to a direction corresponding to the maximum windward area and maintain stability, it is necessary to set the command attitude quaternion in the attitude controller to an attitude quaternion corresponding to an angle of direction of 0°;

in order to accurately describe a size and a direction of the angle of direction, a velocity coordinate system $x_o y_o z_o$ is established, with an origin of the coordinate system being a center of mass of the spacecraft; a $y_o$ axis coincides with the velocity direction of the spacecraft, an $x_o$ axis is perpendicular to the $y_o$ axis in the orbital plane, and a direction at which the center of the earth points to the origin of the coordinate system is taken as a positive direction; a $z_o$ axis conforms to the right-hand rule; the angle of direction being kept at 0° is indicative of coincidence between the spacecraft body coordinate system and the velocity coordinate system;

a quaternion feedback-based repositioning control method is adopted, and attitude parameters of the spacecraft body coordinate system with respect to the velocity coordinate system are described using quaternions, which is expressed as follows:

$$\begin{cases} \dot{q} = \frac{1}{2}(q_0 \omega_{bo} + q \times \omega_{bo}) \\ \dot{q}_0 = -\frac{1}{2} q^T \omega_{bo} \end{cases} \quad (21)$$

wherein $\omega_{bo}$ denotes an angular velocity vector of the body coordinate system relative to the velocity coordinate system, and satisfies a relational expression $\omega_{bo} = \omega_b - C_{x_b x_o} \omega_o$; and $\omega_o$ denotes a projection of an orbital angular velocity of the spacecraft in the velocity coordinate system, which is calculated according to the following formula:

$$\omega_o = \frac{|v|}{|r|} \cdot \begin{bmatrix} 0 \\ 0 \\ 1 \end{bmatrix} \quad (22)$$

$C_{x_b x_o}$ denotes a transformation matrix from the body coordinate system to the velocity coordinate system, which is expressed as follows:

$$C_{x_b x_o} = \begin{bmatrix} q_0^2 + q_1^2 - q_2^2 - q_3^2 & 2(q_1 q_2 + q_0 q_3) & 2(q_1 q_3 - q_0 q_2) \\ 2(q_1 q_3 + q_0 q_3) & q_0^2 - q_1^2 + q_2^2 - q_3^2 & 2(q_0 q_1 + q_2 q_3) \\ 2(q_1 q_2 - q_0 q_2) & 2(q_2 q_3 - q_0 q_1) & q_0^2 - q_1^2 - q_2^2 + q_3^2 \end{bmatrix} \quad (23)$$

given that the transformation matrix $C_{x_o X}$ from the velocity coordinate system to the inertial coordinate system is merely associated with orbit information, which is expressed as follows:

$$C_{x_o X} = \begin{bmatrix} \dfrac{v}{|v|} \times \dfrac{r \times v}{|r \times v|} & \dfrac{v}{|v|} & \dfrac{r \times v}{|r \times v|} \end{bmatrix}^T \quad (24)$$

a transformation matrix $C_{x_b X} = C_{x_b x_o} C_{x_o X}$ from the body coordinate system to the inertial coordinate system is as follows:

in order to make the spacecraft body coordinate system coincide with the velocity coordinate system, the command attitude quaternion is set to $[0\ 0\ 0\ 1]^T$, and the quaternions of the current body coordinate system and velocity coordinate system are controlled using the quaternion feedback-based repositioning control law;

however, given the distinction of $\omega_b$ and $\omega_{bo}$ in the control law, it is necessary to offset a static difference using an integral term, that is, a complete PID controller is required as follows;

$$u = -kIq_e - cI\omega_b - k_i\int q_e + \omega_b \times I\omega_b \quad (25)$$

wherein $k_i$ denotes an integral term-related parameter;

based on the configuration parameters of the pyramid deorbit sail achieving high attitude stability and high deorbiting efficiency obtained in step 2, and the pyramid deorbit sail system-oriented dynamics model featuring three-dimensional orbit-and-attitude coupling considering airflow obstruction established in step 1, transfer of the velocity coordinate system with respect to the body coordinate system is considered in the quaternion feedback-based repositioning control law to develop the quaternion feedback-based repositioning PID control law as shown in formula (25) for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

9. The attitude control method for a pyramid deorbit sail according to claim 6, wherein step 3 is implemented as follows:

in the quaternion feedback-based repositioning control law, a linear state feedback controller is used for achieving attitude maneuver of the spacecraft, and a gyroscopic term about moment of inertia is directly offset by the control torque, wherein the control law is expressed as follows:

$$u = -Kq_e - C\omega_b + \omega_b \times I\omega_b \qquad (16)$$

wherein $q_e = [q_{1e}\ q_{2e}\ q_{3e}]^T$ denotes a vector of an attitude error quaternion, and K and C each denote a controller gain matrix; an attitude error quaternion $[q_{1e}\ q_{2e}\ q_{3e}\ q_{0e}]^T$ is calculated from a command attitude quaternion $[q_{1c}\ q_{2c}\ q_{3c}\ q_{0c}]^T$ and a current attitude quaternion $[q_1\ q_2\ q_3\ q_0]^T$, according to the following formula:

$$\begin{cases} q_e = q_{0c}q - q_0 q_c + q \times q_c \\ q_{0e} = q_{0c}q_0 + q_c^T q \end{cases} \qquad (17)$$

if a matrix $K^{-1}C$ is positive definite, an origin of a closed-loop system with a controller is globally asymptotically stable; and therefore, K=kI and C=cI are chosen, the algorithm uses scaling of rotational inertia and a derivative gain matrix to reduce overshoot of the controller and make the system globally asymptotically stable;

at this time, a proportional differential control law is expressed as follow:

$$u = -kIq_e - cI\omega_b + \omega_b \times I\omega_b \qquad (18)$$

wherein a gain coefficient k and a damping coefficient c are functions of a systematic intrinsic frequency and a damping ratio required, and are defined as follows:

$$k = 2\omega_n^2,\ c = 2\omega_n \xi$$

wherein $\omega_n$ denotes a systematic intrinsic frequency, and $\xi$ denotes a damping ratio;

a reaction wheel is selected as an actuator, when a rotational speed of the reaction wheel reaches a certain extreme state, the reaction wheel stops absorbing excess moment of momentum from the spacecraft and is in a saturated mode, at this moment, the spacecraft is left out of control, and restrictions are supposed to be imposed on actual torque and angular momentum of a control system, wherein the angular momentum of the reaction wheel is calculated from an equation of state of the reaction wheel as follows:

$$\dot{H}_{RW} = -u - \omega_b \times H_{RW} \qquad (19)$$

wherein $H_{RW}$ denotes angular momentum of the reaction wheel;

in this case, both the spacecraft and a flywheel ought to be considered in an attitude dynamics model;

$$T = I\dot{\omega}_b + \dot{H}_{RW} + \omega_b \times (I\omega_b + H_{RW}) \qquad (20)$$

in order to maneuver the attitude of the pyramid deorbit sail system from any angle to a direction corresponding to the maximum windward area and maintain stability, it is necessary to set the command attitude quaternion in the attitude controller to an attitude quaternion corresponding to an angle of direction of 0°;

in order to accurately describe a size and a direction of the angle of direction, a velocity coordinate system $x_o y_o z_o$ is established, with an origin of the coordinate system being a center of mass of the spacecraft; a $y_o$ axis coincides with the velocity direction of the spacecraft, an $x_o$ axis is perpendicular to the $y_o$ axis in the orbital plane, and a direction at which the center of the earth points to the origin of the coordinate system is taken as a positive direction; a $z_o$ axis conforms to the right-hand rule; the angle of direction being kept at 0° is indicative of coincidence between the spacecraft body coordinate system and the velocity coordinate system;

a quaternion feedback-based repositioning control method is adopted, and attitude parameters of the spacecraft body coordinate system with respect to the velocity coordinate system are described using quaternions, which is expressed as follows:

$$\begin{cases} \dot{q} = \frac{1}{2}(q_0 \omega_{bo} + q \times \omega_{bo}) \\ \dot{q}_0 = -\frac{1}{2} q^T \omega_{bo} \end{cases} \qquad (21)$$

wherein $\omega_{bo}$ denotes an angular velocity vector of the body coordinate system relative to the velocity coordinate system, and satisfies a relational expression $\omega_{bo} = \omega_b - C_{x_b x_o} \omega_o$; and $\omega_o$ denotes a projection of an orbital angular velocity of the spacecraft in the velocity coordinate system, which is calculated according to the following formula:

$$\omega_o = \frac{|v|}{|r|} \cdot \begin{bmatrix} 0 \\ 0 \\ 1 \end{bmatrix} \qquad (22)$$

$C_{x_b x_o}$ denotes a transformation matrix from the body coordinate system to the velocity coordinate system, which is expressed as follows:

$$C_{x_b x_o} = \begin{bmatrix} q_0^2 + q_1^2 - q_2^2 - q_3^2 & 2(q_1 q_2 + q_0 q_3) & 2(q_1 q_3 - q_0 q_2) \\ 2(q_1 q_3 + q_0 q_3) & q_0^2 - q_1^2 + q_2^2 - q_3^2 & 2(q_0 q_1 + q_2 q_3) \\ 2(q_1 q_2 - q_0 q_2) & 2(q_2 q_3 - q_0 q_1) & q_0^2 - q_1^2 - q_2^2 + q_3^2 \end{bmatrix} \qquad (23)$$

given that the transformation matrix $C_{x_o X}$ from the velocity coordinate system to the inertial coordinate system is merely associated with orbit information, which is expressed as follows:

$$C_{x_oX} = \left[ \frac{v}{|v|} \times \frac{r \times v}{|r \times v|} \quad \frac{v}{|v|} \quad \frac{r \times v}{|r \times v|} \right]^T \quad (24)$$

a transformation matrix $C_{x_bX} = C_{x_bx_o}C_{x_oX}$ from the body coordinate system to the inertial coordinate system is as follows:

in order to make the spacecraft body coordinate system coincide with the velocity coordinate system, the command attitude quaternion is set to $[0\ 0\ 0\ 1]^T$, and the quaternions of the current body coordinate system and velocity coordinate system are controlled using the quaternion feedback-based repositioning control law;

however, given the distinction of $\omega_b$ and $\omega_{bo}$ in the control law, it is necessary to offset a static difference using an integral term, that is, a complete PID controller is required as follows;

$$u = -kIq_e - c I\omega_b - k_i \int q_e + \omega_b \times I\omega_b \quad (25)$$

wherein $k_i$ denotes an integral term-related parameter;

based on the configuration parameters of the pyramid deorbit sail achieving high attitude stability and high deorbiting efficiency obtained in step 2, and the pyramid deorbit sail system-oriented dynamics model featuring three-dimensional orbit-and-attitude coupling considering airflow obstruction established in step 1, transfer of the velocity coordinate system with respect to the body coordinate system is considered in the quaternion feedback-based repositioning control law to develop the quaternion feedback-based repositioning PID control law as shown in formula (25) for the deorbit sail system, which allows to maintain attitude stability of the deorbit sail system relative to the velocity direction, keep a maximum windward area and maximum atmospheric resistance for the pyramid deorbit sail in the deorbiting process, and thus further shorten spacecraft deorbiting time and improve spacecraft deorbiting efficiency.

\* \* \* \* \*